United States Patent
Kasajima et al.

(10) Patent No.: US 7,268,841 B2
(45) Date of Patent: Sep. 11, 2007

(54) DISPLAY DEVICE AND ELECTRONIC EQUIPMENT HAVING THE SAME COMPRISING A REGION FOR REFLECTING A POLARIZED LIGHT AND A REGION FOR ABSORBING THE POLARIZED LIGHT

(75) Inventors: Yasushi Kasajima, Shiojiri (JP); Toshihiko Tsuchihashi, Matsumoto (JP); Saori Eisaki, Shiojiri (JP); Takeyoshi Ushiki, Shiojiri (JP); Hiroshi Wada, Horigane-mura (JP); Tsuyoshi Maeda, Ryuo-cho (JP)

(73) Assignee: Seiko Epson Corporation (JP)

( * ) Notice: Subject to any disclaimer, the term of this patent is extended or adjusted under 35 U.S.C. 154(b) by 468 days.

(21) Appl. No.: 10/613,771

(22) Filed: Jul. 3, 2003

(65) Prior Publication Data

US 2004/0125430 A1    Jul. 1, 2004

(30) Foreign Application Priority Data

Jul. 4, 2002  (JP) .............................. 2002-196458

(51) Int. Cl.
*G02F 1/1335* (2006.01)
*G02F 1/1347* (2006.01)
*G02F 1/133* (2006.01)

(52) U.S. Cl. ............................. 349/96; 349/74; 349/73; 349/115

(58) Field of Classification Search ................ 359/247, 359/249; 349/74, 77, 82, 83, 144, 73; 362/607, 362/603
See application file for complete search history.

(56) References Cited

U.S. PATENT DOCUMENTS

| | | | | |
|---|---|---|---|---|
| 4,335,936 A | * | 6/1982 | Nonomura et al. | ............ 349/82 |
| 5,136,406 A | * | 8/1992 | Kato et al. | ..................... 349/76 |
| 5,592,314 A | * | 1/1997 | Ogasawara et al. | ........... 349/18 |

(Continued)

FOREIGN PATENT DOCUMENTS

JP            62-209416         9/1987

(Continued)

OTHER PUBLICATIONS

Communication from the Korean Intellectual Property Office regarding related application.

(Continued)

*Primary Examiner*—Andrew Schechter
*Assistant Examiner*—W. Patty Chen
(74) *Attorney, Agent, or Firm*—Harness, Dickey & Pierce, P.L.C.

(57) ABSTRACT

A display device 100 has a display unit 110 and a display switching unit 120. The display switching unit 120 is provided with a reflective polarizing plate 121, a liquid crystal panel 122, and a polarizing plate 123 arranged in this order from the side of the display unit 110 to the observation side. By controlling the liquid crystal panel 122, the display switching unit can be switched between a light transmissive state and a light reflective state. The display unit 110 and the display switching unit 120 are optically adhered to each other by an adhesive layer 131. Thus, deterioration of the contrast by boundary reflection can be restrained, and the flatness and the rigidity of the device can be improved.

13 Claims, 14 Drawing Sheets

U.S. PATENT DOCUMENTS

| | | | |
|---|---|---|---|
| 5,686,979 A | 11/1997 | Weber et al. | 349/96 |
| 5,953,090 A | 9/1999 | Ozeki et al. | |
| 6,163,354 A * | 12/2000 | Yamahara et al. | 349/117 |
| 6,201,770 B1 * | 3/2001 | Arikawa et al. | 368/84 |
| 6,322,236 B1 | 11/2001 | Campbell et al. | |
| 6,456,279 B1 | 9/2002 | Kubo et al. | 345/173 |
| 6,462,724 B1 | 10/2002 | Ozawa et al. | 345/87 |
| 6,593,901 B1 | 7/2003 | Kitazawa et al. | |
| 6,903,784 B1 | 6/2005 | Basturk | |
| 2001/0011029 A1 * | 8/2001 | Iwabuchi et al. | 455/566 |
| 2001/0022632 A1 | 9/2001 | Umemoto et al. | 349/12 |
| 2002/0054261 A1 * | 5/2002 | Sekiguchi | 349/122 |
| 2003/0128316 A1 * | 7/2003 | Tsuji | 349/113 |
| 2003/0160740 A1 * | 8/2003 | Hedrick | 345/32 |

FOREIGN PATENT DOCUMENTS

| | | |
|---|---|---|
| JP | 09090357 A * | 4/1997 |
| JP | 9-152596 | 10/1997 |
| JP | 11-258603 | 9/1999 |
| JP | 2001-296546 | 10/2001 |
| JP | 2001-318374 | 11/2001 |
| JP | 2002-040409 | 2/2002 |
| JP | 2002182199 A * | 6/2002 |
| JP | 2002-536702 | 10/2002 |
| KR | 1999-028381 | 4/1999 |
| KR | 2000-0030026 | 5/2000 |
| KR | 2001-0098662 | 11/2001 |
| KR | 10-0355280 | 12/2002 |
| KR | 10-0470253 | 2/2005 |
| WO | 00-36582 | 6/2000 |
| WO | 00/48037 | 8/2000 |

OTHER PUBLICATIONS

Communication from Korean Patent Office regarding counterpart application.

Communication from Japanese Patent Office regarding corresponding application.

* cited by examiner

FIG. 11
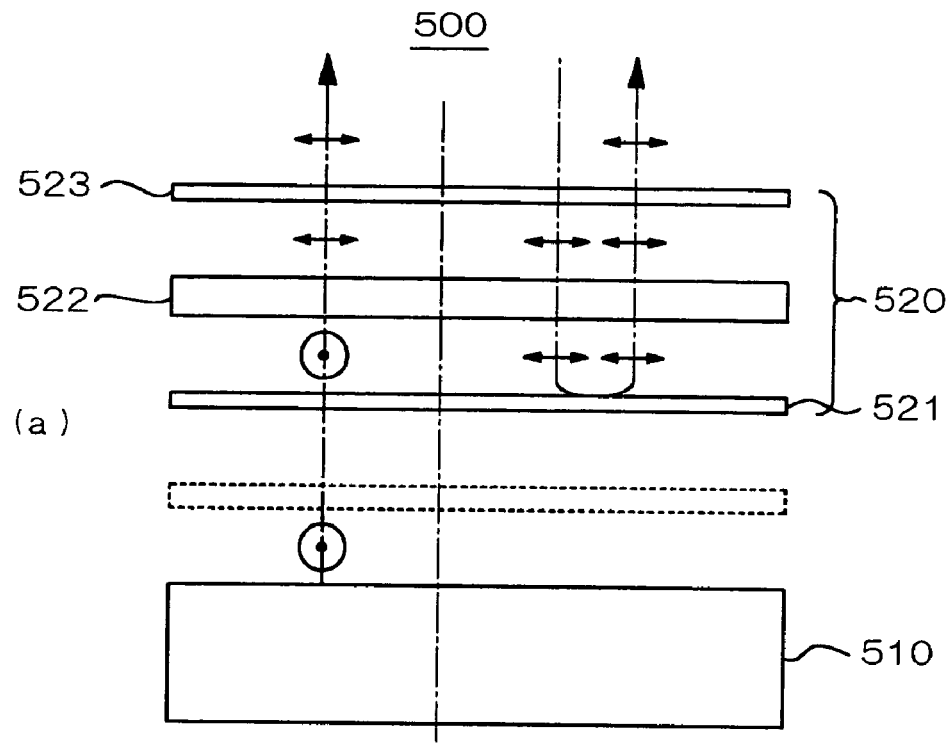
(a)
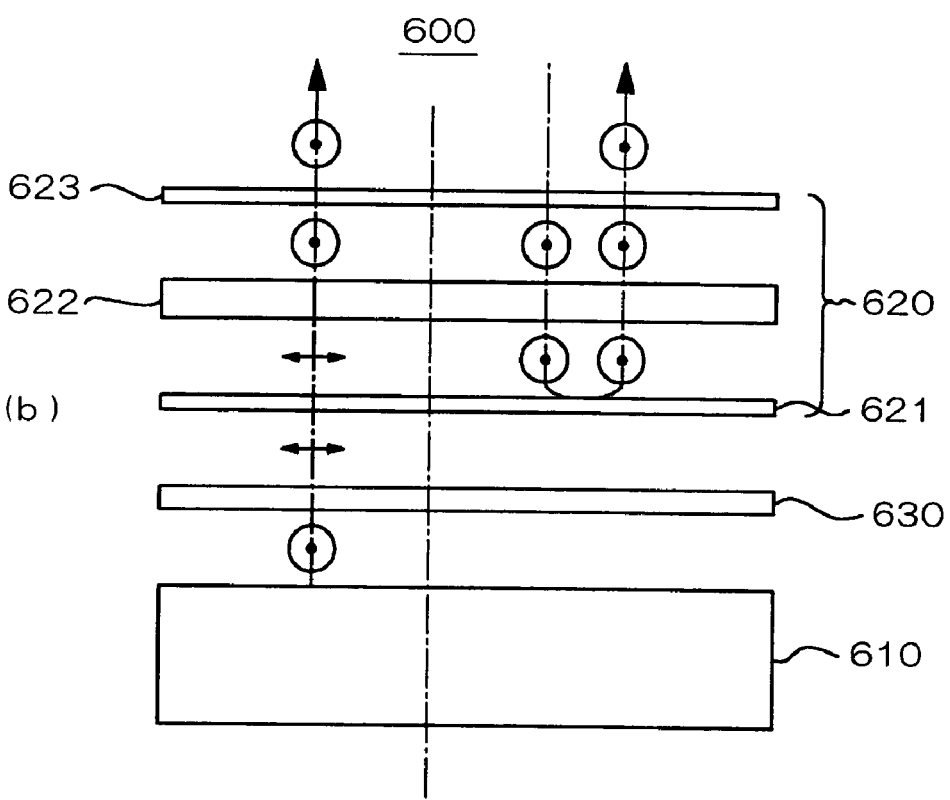
(b)

DISPLAY DEVICE AND ELECTRONIC EQUIPMENT HAVING THE SAME COMPRISING A REGION FOR REFLECTING A POLARIZED LIGHT AND A REGION FOR ABSORBING THE POLARIZED LIGHT

BACKGROUND OF THE INVENTION

1. Field of the Invention

The present invention relates to a display device and electronic equipment having the same, and especially relates to a structure of a display body capable of switching a display screen into a mirror mode.

2. Related Art

Hitherto, there has been known a display device which is switchable between a normal display mode and a mirror mode by overlapping two liquid crystal panels. For example, there is a display device in which a display switching unit is provided on the observation side of the display unit having the same structure as that of a typical liquid crystal display device, and a reflective polarizing plate, a liquid crystal panel, and an absorptive polarizing plate are disposed in the display switching unit in this order from the side of the display unit. In this display device, the reflective polarizing plate of the display switching unit transmits the first polarization component and reflects the second polarization component having a polarization axis intersecting with the first polarization component, the liquid crystal panel is designed to be switchable between a state of transmitting light after changing the first polarization component into the second polarization component and a state of transmitting light without changing the polarization axis, and the absorptive polarizing plate transmits, for example, the first polarization component and absorbs the second polarization component. The display unit emits the first polarization component to the display switching unit and a predetermined display image is formed by the first polarization component.

In the display device constituted as described above, when the liquid crystal panel of the display switching unit is in the transmissive state without changing the polarization axis, the first polarization component emitted from the display unit passes through the reflective polarizing plate to enter the liquid crystal panel, and is observed as it is as the first polarization component after passing through the absorptive polarizing plate. Thus, it is possible to visibly recognize the display condition of the display unit (display mode). In the transmissive state of the liquid crystal panel, which changes the first polarization component into the second polarization component for transmission, when the first polarization component emitted from the display unit passes through the reflective polarizing plate to enter the liquid crystal panel, it is changed into the second polarization component and therefore, it is absorbed by the absorptive polarizing plate, and the display condition cannot be visibly recognized. When outside light enters into the device at this time, the outside light passes through the absorptive polarizing plate, hence to be the first polarization component, and it passes through the liquid crystal panel, hence to be the second polarization component. Therefore, it is reflected by the reflective polarizing plate, changed into the first polarization component after passing through the liquid crystal panel again, and passes through the absorptive polarizing plate. Accordingly, the display surface is visibly recognized as a mirror surface (mirror mode).

In the above-mentioned conventional display device, however, the light transmitted through the liquid crystal panel provided in the display switching unit, is visibly recognized in both the display mode and the mirror mode. Therefore, there are problems such that contrast is deteriorated due to a boundary reflection in both sides of the display switching unit, coloring caused by the optical characteristic of the display switching unit, the characteristic of the viewing angle is deteriorated, and blurring of a display image easily occurs. In any case, the conventional display device cannot avoid deterioration of the display quality caused by the double structure of the display unit and the display switching unit.

The present invention attempts to solve the above problems, and one object of the invention is to provide a new structure of a display device having a display unit and display switching unit, capable of restraining the deterioration of the display quality including contrast deterioration, coloring, reduction of viewing angle, and blur caused by the existence of the display switching unit.

SUMMARY

In order to solve the above problems, a display device of the invention comprises a display unit of emitting light for forming a predetermined display mode, and a display switching unit disposed in a way of overlapping with the display unit at least in one portion, wherein the display switching unit includes first polarization component selecting means, polarized-light transmitting axis changing means, and second polarization component selecting means sequentially disposed from the display unit toward an observation side, the first polarization component selecting means transmitting a first polarization component and reflecting a second polarization component having a polarization axis intersecting with a polarization axis of the first polarization component, the polarized-light transmitting axis changing means formed to be switchable between a state of transmitting light after changing the first polarization component into the second polarization component, and a state of transmitting light without substantially changing the polarization axis of the incident light substantially, the second polarization component selecting means transmitting one of the first polarization component and the second polarization component, and absorbing or reflecting the other polarization component, the display unit emits the first polarization component for forming the display mode, and the display unit and the display switching unit are optically adhered to each other.

Since the display unit and the display switching unit are optically adhered to each other, it is possible to restrain deterioration of the visibility (for example, contrast) for the display condition of the display unit, due to the boundary reflection of the display unit and the display switching unit. Since the display unit and the display switching unit are optically adhered to each other, one is supported by the other in the display unit and the display switching unit, thereby enhancing the rigidity or strength. Therefore, it is possible to obtain the flatness of the display screen and improve the robustness of the device. Especially, the visibility of the display condition of the display unit can be enhanced by making the display switching unit thin. Even if the rigidity of the display switching unit is deteriorated by making it thin, the flatness and the robustness can be obtained by supporting the display switching unit with the display unit.

In the invention, it is preferable that the display unit and the display switching unit are optically adhered to each other by adhesive or an adhesive layer formed by the adhesive. By optically adhering the display unit and the display switching unit by the adhesive or the adhesive layer formed by the adhesive, it is possible to fix the display unit and the display switching unit based on its adhesive and adhering force in a state of mutually supporting them, thereby enhancing and maintaining the flatness and the rigidity.

In the invention, it is preferable that the refraction index of the adhesive layer is within the range of 1.30 to 1.50. By fixing the refraction index of the adhesive layer within the range of 1.30 to 1.50, it is possible to reduce the power of the boundary reflection effectively. Generally, the refraction index can be adjusted easily for the adhesive layer by blending various types of resin materials.

In the invention, it is preferable that the adhesive layer is a gel material. By forming the adhesive layer with a gel material, the adhesive layer can be deformed easily, hence to absorb a stress caused by a difference in the thermal expansion coefficient and rigidity between the display unit and the display switching unit, and to prevent leaking to the surrounding area because of having retention to some extent, therefore its handling is easy.

Another display device of the invention comprises a display unit of emitting light for forming a predetermined display mode, and a display switching unit disposed in a way of overlapping with the display unit at least in one portion, wherein the display switching unit includes first polarization component selecting means, polarized-light transmitting axis changing means, and second polarization component selecting means sequentially disposed from the display unit toward an observation side, the first polarization component selecting means transmits a first polarization component and reflects a second polarization component having a polarization axis intersecting with a polarization axis of the first polarization component, the polarized-light transmitting axis changing means is formed to be switchable between a state of transmitting light after changing the first polarization component into the second polarization component and a state of transmitting light without substantially changing the polarization axis of the incident light substantially, the second polarization component selecting means transmits one of the first polarization component and the second polarization component and absorbs or reflects the other polarization component, the display unit emits the first polarization component for forming the display mode, and an anti-reflection coating is formed on both sides of the display switching unit.

By forming the anti-reflection coating on both sides of the display switching unit, it is possible to restrain from deteriorating the contrast of the display condition of the display unit and the brightness of a display due to the boundary reflection caused by providing the display unit, hence to secure the visibility.

In the invention, it is preferable that the anti-reflection coating is formed on a surface of the display unit on a side of the display switching unit. By forming the anti-reflection coating also on the light emitting surface of the display unit, it is possible to prevent deterioration of the visibility caused by the reflection of an outside light.

Another display device of the invention comprises a display unit of emitting light for forming a predetermined display mode, and a display switching unit disposed in a way of overlapping with the display unit at least in one portion, wherein the display switching unit includes first polarization component selecting means, polarized-light transmitting axis changing means, and second polarization component selecting means sequentially disposed from the display unit toward an observation side, the first polarization component selecting means transmits a first polarization component and reflects a second polarization component having a polarization axis intersecting with a polarization axis of the first polarization component, the polarized-light transmitting axis changing means is formed to be switchable between a state of transmitting light after changing the first polarization component into the second polarization component and a state of transmitting light without substantially changing the polarization axis of the incident light, the second polarization component selecting means transmits one of the first polarization component and the second polarization component and absorbs or reflects the other polarization component, the display unit emits the first polarization component for forming the display mode, and the display switching unit is provided with a whole pixel region, which is formed by arranging a single pixel formed on an entire face, and a pixel-arranged region, which is formed by arranging a plurality of pixels and each pixel having a predetermined shape smaller than the whole pixel region.

According to the invention, by providing the whole pixel region and the pixel-arranged region in the display switching unit, it is possible to realize the display mode and the mirror mode as a whole in the whole pixel region, and realize the display condition by combination of the display mode and the mirror mode in the pixel-arranged region, which is different from the display condition of the display unit.

Further, another display device of the invention comprises a display unit of emitting light for forming a predetermined display mode, and a display switching unit disposed in a way of overlapping with the display unit at least in one portion, wherein the display switching unit includes first polarization component selecting means, polarized-light transmitting axis changing means, and second polarization component selecting means sequentially disposed from the display unit toward an observation side, the first polarization component selecting means transmits a first polarization component and reflects a second polarization component having a polarization axis intersecting with a polarization axis of the first polarization component, the polarized-light transmitting axis changing means is formed to be switchable between a state of transmitting light after changing the first polarization component into the second polarization component and a state of transmitting light without substantially changing the polarization axis of the incident light substantially, the second polarization component selecting means transmits one of the first polarization component and the second polarization component, and absorbs or reflects the other polarization component, the display unit emits the first polarization component for forming the display mode, and the display switching unit is provided with a region for disposing the first polarization component selecting means, and a region for disposing a third polarization component selecting means for transmitting the first polarization component and for absorbing the second polarization component instead of the first polarization component selecting means.

According to the invention, by providing the region for disposing the third polarization component selecting means instead of the first polarization component selecting means in the display switching unit, the display mode can be realized by the display unit in this region but the mirror mode cannot be realized there. Accordingly, by arranging a plurality of pixels in the region for disposing the third polarization component selecting means, it is possible to realize the unique display condition in the display switching unit, and also realize the display mode and the mirror mode at the same time.

Another display device of the invention comprises a display unit of emitting light for forming a predetermined display mode, and a display switching unit disposed in a way of overlapping with the display unit at least in one portion, wherein the display switching unit includes first polarization component selecting means, polarized-light transmitting axis changing means, and second polarization component selecting means sequentially disposed from the display unit toward an observation side, the first polarization component selecting means transmits a first polarization component and reflects a second polarization component having a polarization axis intersecting with a polarization axis of the first polarization component, the polarized-light transmitting axis changing means is formed to be switchable between a state of transmitting light after changing the first polarization component into the second polarization component and a state of transmitting light without substantially changing the polarization axis of the incident light substantially, the second polarization component selecting means transmits one of the first polarization component and the second polarization component and absorbs or reflects the other polarization component, the display unit emits the first polarization component for forming the display mode, and the display unit is provided with a region not overlapping with the display switching unit.

According to the invention, it is possible to provide a visibly recognizable display condition directly without viewing through the display switching unit, in the region not overlapping with the display switching unit, provided in the display unit. Accordingly, it is possible to provide a visibly recognizable display mode and mirror mode at the same time.

A display device of the invention comprises a display unit of emitting light for forming a predetermined display mode, and a display switching unit disposed in a way of overlapping with the display unit at least in one portion, wherein the display switching unit includes first polarization component selecting means, polarized-light transmitting axis changing means, and second polarization component selecting means sequentially disposed from the display unit toward an observation side, the first polarization component selecting means transmits a first polarization component and reflects a second polarization component having a polarization axis intersecting with a polarization axis of the first polarization component, the polarized-light transmitting axis changing means is formed to be switchable between a state of transmitting light after changing the first polarization component into the second polarization component and a state of transmitting light without substantially changing the polarization axis of the incident light, the second polarization component selecting means transmits one of the first polarization component and the second polarization component and absorbs or reflects the other polarization component, the display unit emits the first polarization component for forming the display mode, and the display switching unit is provided with a region not overlapping with the display unit on a plane, and a plurality of pixels of a predetermined shape are arranged in the region.

According to the invention, by arranging a plurality of pixels in the region not overlapping with the display unit on a plane in the display switching unit, it is possible to realize the mirror mode and, at the same time, a predetermined display condition by the display switching unit itself.

A display device of the invention comprises a display unit of emitting light for forming a predetermined display mode, and a display switching unit disposed in a way of overlapping with the display unit at least in one portion, wherein the display switching unit includes first polarization component selecting means, polarized-light transmitting axis changing means, and second polarization component selecting means sequentially disposed from the display unit toward an observation side, the first polarization component selecting means transmits a first polarization component and reflects a second polarization component having a polarization axis intersecting with a polarization axis of the first polarization component, the polarized-light transmitting axis changing means is formed to be switchable between a state of transmitting light after changing the first polarization component into the second polarization component and a state of transmitting light without substantially changing the polarization axis of the incident light, the second polarization component selecting means transmits one of the first polarization component and the second polarization component and absorbs or reflects the other polarization component, the display unit emits the third polarization component for forming the display mode, and polarization converting means for converting the third polarization component into the first polarization component is provided between the display unit and the display switching unit.

According to the invention, since the position of the display unit and the display switching unit can be changed according to the polarization converting means disposed between the display unit and the display switching unit, it is possible to change the polarized mode of the emitted light in the display mode and the mirror mode, which are visible via the display switching unit. For example, in order to make the display visible even through polarized sun glasses, it is necessary to emit the polarization having the vertical vibration surface from the display switching unit. Accordingly, the polarized-light transmitting axis of the second polarization component selecting means must be directed in the vertical direction, or at the crossed angle with the polarized-light transmitting axis thereof and the vertical direction must be small (for example, fifteen (15) degrees or less), and therefore, the position of the display switching unit is restrained. In order to restrain the position of the display switching unit, the position of the display unit also must correspond to this. In the case of the invention, however, by providing the polarization converting means between the display unit and the display switching unit, it is possible to allow a deviation of correspondence depending on the conversion function of the polarization converting means between the position of the display unit and the position of the display switching unit, thereby it is possible to change the direction of the vibration surface of the polarization emitted from the display switching unit, for example, without changing the position of the display unit.

In the invention, it is preferable that the polarization converting means is a retardation plate. By using the retardation plate, it is possible to change the vibration surface of the polarization easily. Especially, when the retardation plate is a plate of a half ($\frac{1}{2}$) wavelength, it is possible to rotate the vibration surface of the straightway polarization by ninety (90) degrees around the optical axis.

In the invention, it is preferable that the second polarization component selecting means is absorptive polarization selecting means for transmitting the one of the polarization components and absorbing the other polarization component. According to this, it is possible to reduce the surface reflection of the second polarization component means in the display mode, thereby enhancing the quality of a display image of the display mode.

A display device of the invention comprises a display unit of emitting light for forming a predetermined display mode, and a display switching unit disposed in a way of overlapping with the display unit at least in one portion, wherein the display switching unit includes first polarization component selecting means, polarized-light transmitting axis changing means, and second polarization component selecting means sequentially disposed from the display unit toward an observation side, the first polarization component selecting means transmits a first polarization component and reflects a second polarization component having a polarization axis intersecting with a polarization axis of the first polarization component, the polarized-light transmitting axis changing means is formed to be switchable between a state of transmitting light after changing the first polarization component into the second polarization component and a state of transmitting light without substantially changing the polarization axis of the incident light, the second polarization component selecting means transmits one of the first polarization component and the second polarization component and absorbs or reflects the other polarization component, the display unit emits the first polarization component for forming the display mode, the display unit includes an illuminating device disposed on the side of the display switching unit, and a reflective display device disposed on the opposite side of the illuminating device and away from the display switching unit, the illuminating device irradiates light toward the reflective display device, and transmits light incident from the reflective display device, the polarized-light transmitting axis changing means includes a TN-type liquid crystal layer and voltage application means for applying a predetermined electric field to the TN-type liquid crystal layer in a thickness direction, and the TN-type liquid crystal layer has "$\Delta n \cdot d$" within the range of 0.7 µm to 1.7 µm.

According to the invention, since the illuminating device illuminates the reflective display device, the brightness of the reflective display device can be enhanced, and a display by use of an outside light is enabled without a light of the illuminating device, thereby decreasing the power consumption. Especially, since the polarized-light transmitting axis changing means includes the TN-type liquid crystal layer and the "$\Delta n \cdot d$" of the TN-type liquid crystal layer is within the range of 0.7 µm to 1.7 µm, it is possible to reduce the coloring of the display mode and the mirror mode formed by the display unit and brighten the display. Further, since the "$\Delta n \cdot d$" is small, it is possible to reduce the blur of the display image and secure the range of the viewing angle to some degree.

In this case, it is preferable that the TN-type liquid crystal layer has the "$\Delta n \cdot d$" within the range of 0.9 µm to 1.3 µm. Since the TN-type liquid crystal layer has the "$\Delta n \cdot d$" within this range, the coloring can be further reduced and the brighter display is possible. Especially, since the coloring in the mirror mode is remarkably improved, the ideal mirror surface state can be realized.

A display device of the invention comprises a display unit of emitting light for forming a predetermined display mode, and a display switching unit disposed in a way of overlapping with the display unit at least in one portion, wherein the display switching unit includes first polarization component selecting means, polarized-light transmitting axis changing means, and second polarization component selecting means sequentially disposed from the display unit toward an observation side, the first polarization component selecting means transmits a first polarization component and reflects a second polarization component having a polarization axis intersecting with a polarization axis of the first polarization component, the polarized-light transmitting axis changing means is formed to be switchable between a state of transmitting light after changing the first polarization component into the second polarization component and a state of transmitting light without substantially changing the polarization axis of the incident light, the second polarization component selecting means transmits one of the first polarization component and the second polarization component and absorbs or reflects the other polarization component, the display unit emits the first polarization component for forming the display mode, the display unit includes an illuminating device disposed on the side of the display switching unit, and a reflective display device disposed on the opposite side of the illuminating device and away from the display switching unit, the illuminating device irradiates light toward the reflective display device and transmits light incident from the reflective display device, the polarized-light transmitting axis changing means includes a TN-type liquid crystal layer and voltage application means for applying a predetermined electric field to the TN-type liquid crystal layer in a thickness direction, and the TN-type liquid crystal layer has "$\Delta n \cdot d$" within the range of 0.50 µm to 0.65 µm.

According to the invention, since the reflective display device is illuminated by the illuminating device, the brightness of the reflective display device can be enhanced, and the display by use of an outside light is enabled without a light of the illuminating device, thereby reducing the power consumption. Especially, since the polarized-light transmitting axis changing means includes the TN-type liquid crystal layer and the "$\Delta n \cdot d$" of the TN-type liquid crystal layer is within the range of 0.50 µm to 0.65 µm, it is possible to secure a wide viewing angle in the display mode and the mirror mode.

A display device of the invention comprises a display unit of emitting light for forming a predetermined display mode, and a display switching unit disposed in a way of overlapping with the display unit at least in one portion, wherein the display switching unit includes first polarization component selecting means, polarized-light transmitting axis changing means, and second polarization component selecting means sequentially disposed from the display unit toward an observation side, the first polarization component selecting means transmits a first polarization component and reflects a second polarization component having a polarization axis intersecting with a polarization axis of the first polarization component, the polarized-light transmitting axis changing means is formed to be switchable between a state of transmitting light after changing the first polarization component into the second polarization component and a state of transmitting light without substantially changing the polarization axis of the incident light, the second polarization component selecting means transmitting one of the first polarization component and the second polarization component and absorbs or reflects the other polarization component, the display unit includes polarized-light transmitting axis changing means for displaying and emits the first polarization component for forming the display mode, the display unit includes an illuminating device disposed on the side of the display switching unit and a reflective display device having the polarized-light transmitting axis changing means for displaying disposed on the opposite side of the illuminating device and away from the display switching unit, the illuminating device irradiates light toward the reflective display device and transmits light incident from the reflective display device, a ratio of $\alpha_m = \Delta n_m$ ($\lambda=450$ nm)$/\Delta n_m$ ($\lambda=590$ nm), indicating wavelength distribution of anisotropic refraction index of the polarized-light transmitting axis changing means, when the anisotropic refraction index for a light of wavelength "$\lambda$" of the polarized-light transmitting axis changing means is defined as $\Delta n_m(\lambda)$, and $\alpha_d = \Delta n_d(\lambda=450 \text{ nm})/\Delta n_d(\lambda=590 \text{ nm})$, indicating wavelength distribution of the anisotropic refraction index of the polarized-light transmitting axis changing means for displaying when the anisotropic refraction index for a light of wavelength "λ" of the polarized-light transmitting axis changing means for displaying is defined as $\Delta n_d(\lambda)$, is within the range of 0.9 to 1.1.

According to the invention, since the reflective display device is illuminated by the illuminating device, the brightness of the reflective display device can be enhanced, and the display by use of an outside light is possible without a light of the illuminating device, thereby reducing the power consumption. Especially, since the ratio of the wavelength distribution of the polarized-light transmitting axis changing means of the display switching unit to the wavelength distribution of the anisotropic refraction index of the polarized-light transmitting axis changing means for displaying of the display unit is within the range of 0.9 to 1.1, a difference in the wavelength distribution characteristic of the anisotropic refraction index between the display unit and the display switching unit is reduced, and therefore, it is possible to restrain from deteriorating the brightness of the display caused by providing the display switching unit, and reduce the coloring of the display mode.

A display device of the invention comprises a display unit of emitting light for forming a predetermined display mode, and a display switching unit disposed in a way of overlapping with the display unit at least in one portion, wherein the display switching unit includes first polarization component selecting means, polarized-light transmitting axis changing means, and second polarization component selecting means sequentially disposed from the display unit toward an observation side, the first polarization component selecting means transmits a first polarization component and reflects a second polarization component having a polarization axis intersecting with a polarization axis of the first polarization component, the polarized-light transmitting axis changing means is formed to be switchable between a state of transmitting light after changing the first polarization component into the second polarization component and a state of transmitting light without substantially changing the polarization axis of the incident light, the second polarization component selecting means transmits one of the first polarization component and the second polarization component and absorbs or reflects the other polarization component, the display unit emits the first polarization component for forming the display mode, the display unit includes an illuminating device disposed on the side of the display switching unit, and a reflective display device disposed on the opposite side of the illuminating device and away from the display switching unit, the illuminating device irradiates light toward the reflective display device and transmits light incident from the reflective display device, and the variation amount of the anisotropic refraction index $\Delta n_m$ in a visible region of the polarized-light transmitting axis changing means is within ±8% in the range of –20° C. to 60° C. with respect to the value of 25° C.

According to the invention, since the reflective display device is illuminated by the illuminating device, the brightness of the reflective display device can be enhanced, and the display by use of an outside light is possible without a light of the illuminating device, thereby reducing the power consumption. Especially, when the variation amount of $\Delta n_m$ exceeds 8%, the display characteristics such as color tone and contrast are rapidly deteriorated, but by fixing the variation within ±8% in the range of –20° C. to 60° C. with respect to the value of 25° C., the transmittance of the display switching unit can be stabilized, and the reduction of the transmittance caused by a temperature change can be restrained. Especially, in order to maintain the display characteristics, it is preferable that the variation is within ±5%.

In the invention, it is preferable that the second polarization component selecting means is absorptive polarization selecting means for transmitting the one of the polarization components and absorbing the other polarization component. According to this, the surface reflection of the second polarization component means in the display mode can be reduced, thereby further enhancing the quality of the display image in the display mode.

In the invention, it is preferable that the display unit and the display switching unit are optically adhered to each other.

In this case, it is preferable that the display unit and the display switching unit are optically adhered to each other by adhesive or an adhesive layer formed by the adhesive.

It is preferable that the refraction index of the adhesive layer is in the range of 1.30 to 1.50.

It is preferable that the adhesive layer is a gel material.

In the invention, it is preferable that an anti-reflection coating is formed on both sides of the display switching unit. In this case, it is preferable that the anti-reflection coating is formed on a surface of the display unit on the side of the display switching unit.

It is preferable that the display switching unit is provided with a whole pixel region, which is formed by arranging a single pixel on an entire face, and a pixel-arranged region, which is formed by arranging a plurality of pixels and each pixel having a predetermined shape smaller than the whole pixel region.

It is preferable that the display switching unit is provided with a region for disposing the first polarization component selecting means, and a region for disposing a third polarization component selecting means for transmitting the first polarization component and for absorbing the second polarization component instead of the first polarization component selecting means.

It is preferable that the display unit is provided with a region not overlapping with the display switching unit.

It is preferable that the display switching unit is provided with a region not overlapping with the display unit on a plane, and that a plurality of pixels of a predetermined shape are arranged in the region.

A display device of the invention comprises a display unit of emitting light for forming a predetermined display mode, and a display switching unit disposed in a way of overlapping with the display unit at least in one portion, wherein the display switching unit includes first polarization component selecting means, polarized-light transmitting axis changing means, and second polarization component selecting means sequentially disposed from the display unit toward an observation side, the first polarization component selecting means transmits a first polarization component and reflects a second polarization component having a polarization axis intersecting with a polarization axis of the first polarization component, the polarized-light transmitting axis changing means is formed to be switchable between a state of transmitting light after changing the first polarization component into the second polarization component and a state of transmitting light without substantially changing the polarization axis of the incident light, the second polarization component selecting means transmits one of the first polarization component and the second polarization component and absorbs or reflects the other polarization component, the display unit emits the third polarization component for forming the display mode, the display unit includes an illuminating device disposed on the side of the display switching unit, and a reflective display device disposed on the opposite side of the illuminating device and away from the display switching unit, the illuminating device irradiates light toward the reflective display device and transmits light incident from the reflective display device, and polarization converting means for converting the third polarization component into the first polarization component is provided between the display unit and the display switching unit.

In the invention, it is preferable that the polarization converting means is a retardation plate. In this case, it is preferable that the retardation plate is a plate of a half (½) wavelength.

Electronic equipment of the invention comprises any one of the display devices, display controlling means for controlling the display unit, and display switch controlling means for controlling the display switching unit, which are described above. Since this display device can switch the display mode and the mirror mode as mentioned above, the display screen can be used as a mirror, and therefore, it is preferable that the display device is formed as a portable electronic apparatus such as a portable telephone or a portable information terminal.

BRIEF DESCRIPTION OF THE DRAWINGS

FIGS. 11(a) and 11(b) are a schematic cross sectional view showing a display device having the basic structure and a schematic cross sectional view showing the structure of the seventh embodiment of the invention.

DETAILED DESCRIPTION

Embodiments of a display device and electronic equipment according to the invention will be described in detail with reference to the accompanying drawings.

BASIC STRUCTURAL EXAMPLE OF THE EMBODIMENTS

At first, basic structural examples applicable to the respective embodiments according to the invention will be described with reference to FIG. 1 to FIG. 4.

First Structural Example

Figure 1:
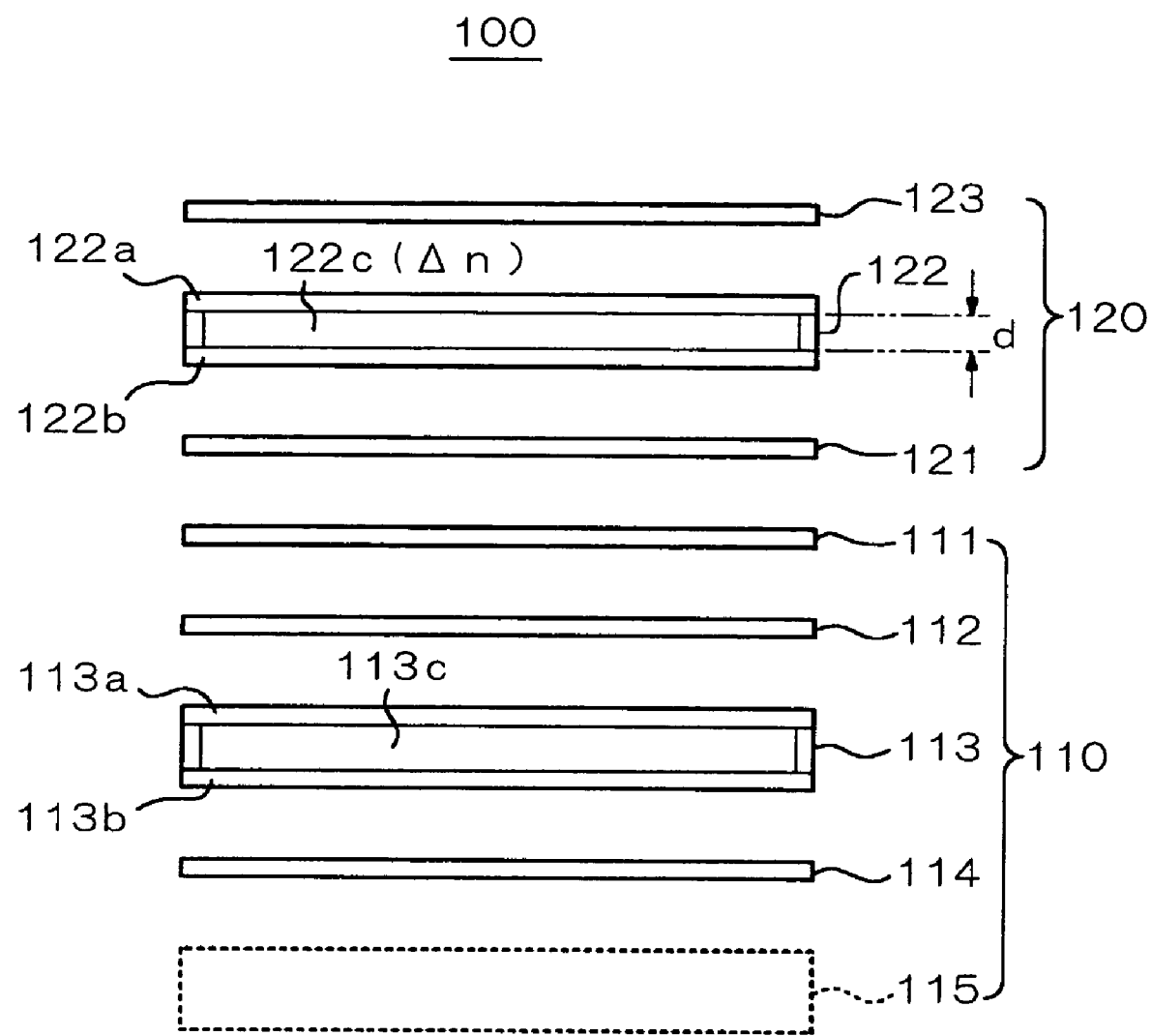
FIG. 1 is a schematic structure view showing a display device of the first structural example showing an example of the basic structure according to the invention.

A display device 100 shown in FIG. 1 is formed by a display switching unit 120 and a display unit 110 overlapping two dimensionally. The display unit 110 and the display switching unit 120 should be overlapped with each other at least in one portion.

The display unit 110 may have any structure capable of forming the display condition of a predetermined image and the like on the display switching unit 120 side (for example, various display means such as an EL (electro luminescence) element, a PDP (plasma display panel) device, and a FED (field emission device)), and in the case of this embodiment, the display unit designed for a liquid crystal display device is used.

As the liquid crystal mode of the display unit 110, the TN (Twisted Nematic) mode, the STN (Super Twisted Nematic) mode, and the ECB (Electrically Controlled Birefringence) mode are preferable. Since the display means by these liquid crystal modes are designed to realize the display condition by using a polarizing plate, it can obtain a high display quality with a comparatively low driving voltage, and especially, it is preferable in case of mounting in a portable electronic apparatus.

A driving mode of the display unit 110 may be an active driving mode such as active matrix drive using an active element including TFT (Thin Film Transisitor) and TFD (Thin Film Diode), or a passive driving mode such as simple driving or multiplex driving without using the above active element.

A panel structure of the display unit 110 may be a reflective panel, reflective semi-transparent panel, or a transparent panel. In the case of the reflective panel, a reflective surface is formed on the opposite side of the observation side of optical elements. In case of the reflective semi-transparent panel, there are a case of forming the reflective surface with a reflective semi-transparent material such as a half mirror and a case of providing an aperture on the reflective surface for every pixel or segment.

The structure of the display unit 110 of the embodiment is described more specifically. For example, as shown in FIG. 1, the display unit 110 includes a polarizing plate 111, a retardation plate 112, a liquid crystal panel 113, a polarizing plate 114, and a back light 115 in this order from the side of the display switching unit 120. In case of forming the display unit 110 as the reflective liquid crystal display device, a reflective plate may be disposed instead of the back light 115. This reflective plate may be disposed inside the liquid crystal panel 113.

The liquid crystal panel 113 is formed by interposing a liquid crystal layer 113c between two substrates 113a and 113b. The two substrates 113a and 113b are held together by a seal material with a predetermined interval (for example, about 3 to 10 μm). Electrodes (not illustrated) are formed on the inner surfaces of the substrates 113a and 113b, and these electrodes are adopted to apply an electric field to the liquid crystal layer 113c. A liquid crystal display device of a reflective semi-transmissive type can be formed by a reflective layer having a semi-transmittance characteristic of visible light, and a reflective layer having a small aperture for every pixel inside the liquid crystal panel 113.

The polarizing plates 111 and 114 are arranged at some necessary positions (for example, at the crossed-Nicol position) on the liquid crystal device. As the polarizing plates 111 and 114, there is used a known absorptive polarizing plate for transmitting a polarization component having a vibration surface in parallel to the polarized-light transmitting axis, and absorbing a polarization component having a vibration surface in parallel to the direction of intersecting with the polarized-light transmitting axis (preferably at right angles).

The back light 115 may be of any type that can illuminate the liquid crystal panel 113 with substantially uniform illumination. There are, for example, a light emissive-type end surface back light including an optical waveguide and a light source disposed in the end surface portion of the waveguide, and a light emissive-type rear surface back light including an optical waveguide and a light source disposed in a rear surface of the optical waveguide.

The display switching unit 120 includes a reflective polarizing plate 121, a liquid crystal panel 122, and a polarizing plate 123 disposed in this order from the display unit 110 to the observation side. The reflective polarizing plate 121 transmits a polarizing component having a vibration surface in parallel to the polarized light transmitting axis, and reflects a polarizing component having a vibration surface in parallel to the direction intersecting with the polarized-light transmitting axis (preferably at right angles). As the reflective polarizing plate, a laminate layering double reflex polymer films of several different types, which is disclosed in International Application Laid-Open No. WO95/27919, or one having a plate of one quarter (¼) wavelength disposed on both sides of the cholesteric liquid crystal, can be used. As the above laminated layer, there is a layered film having the trade name of DBEF, produced by 3M Co.

The liquid crystal panel 122 is formed by interposing a liquid crystal layer 122c between two substrates 122a and 122b. Transparent electrodes (not illustrated) are formed respectively on the inner surfaces of the substrates 122a and 122b, and these transparent electrodes are adopted to apply a predetermined electric field to the liquid crystal layer 122c. In case of the liquid crystal panel 122, each one of the integral transparent electrodes may be provided on both sides of the liquid crystal layer 122c so as to substantially cover all surfaces of the effective display region. Alternatively, a plurality of transparent electrodes may be provided on both sides of the liquid crystal layer 122c so as to supply a potential independently.

The polarizing plate 123 is, for example, a known absorptive polarizing plate for transmitting a polarization component having a vibration surface in parallel to the polarized-light transmitting axis and absorbing a polarization component having a vibration surface in parallel to the direction intersecting with the polarized-light transmitting axis (preferably at right angles), in the same way as mentioned above. A reflective polarizing plate formed similarly to the reflective polarizing plate 121 can also be used.

It is preferable that the form of the liquid crystal panel 122 may be the TN panel structure or the STN type panel structure. As a substrate for forming the panel structure, glass (including quartz) or resin (plastic) may be used, or glass may be used on one side and resin may be used on the other side. By using resin for a substrate, it is possible to make the panel thinner and improve the robustness. In case of using the resin for a substrate, since it becomes difficult to obtain the flatness of the liquid crystal panel 122, it is preferable to proved optical adherence to the display unit 110, as described later. For example, by using the transparent resin adhesive having a proper refractive index, the liquid crystal panel 122 can be adhered to the display unit 110 by an adhesive layer substantially free from optical influence.

It is preferable that the polarized-light transmitting axis of the reflective polarizing plate 121 of the display switching unit 120 and the polarized-light transmitting axis of the polarizing plate 111 of the display unit 110 are basically arranged in the same direction. Even if the polarized-light transmitting axis of the reflective polarizing plate 121, and the polarized-light transmitting axis of the polarizing plate 111 are not the same direction, when the crossed angle of both polarized-light transmitting axes is fifteen (15) degrees or less, the display switching function, described below, can be achieved.

In the display device 100 of the embodiment, it is possible to make the display switching unit 120 into a transmissive state or a reflective state by the display switching unit 120 by controlling the density of an electric field applied to the liquid crystal layer 122c of the liquid crystal panel 122 of the display switching unit 120 or by "on/off" switching application of an electric field.

By way of example, the case will be described that the liquid crystal panel 122 of the display switching unit 120 is the TN type liquid crystal panel, and the polarized-light transmitting axis of the reflective polarizing plate 121 is arranged to intersect with the polarized-light transmitting axis of the polarizing plate 123, at right angles. In this case, when no electric field is applied to the liquid crystal layer 122c, the nematic liquid crystal within the liquid crystal layer 122c is in a twist state of ninety (90) degrees, and basically it has an optical rotation of ninety (90) degrees. Accordingly, when an outside light enters into the display switching unit 120, a transmissive light becomes a straightway (i.e., planar) polarization having a vibration surface in parallel with the polarized-light transmitting axis of the polarizing plate 123 by passing through the polarizing plate 123, and the straightway polarization is converted into a straightway polarization having a vibration surface crossing the polarized-light transmitting axis of the polarizing plate 123 at right angles by passing through the liquid crystal panel 122. This straightway polarization is transmitted through the reflective polarizing plate 121 because of having a vibration surface in parallel with the polarized-light transmitting axis of the reflective polarizing plate 121, and entered into the display unit 110. The light entered into the display unit 110 is transmitted through the polarizing plate 111, and when the display unit 110 forms the reflective display device (for example, reflective or reflective semi-transmissive liquid crystal display device), the light becomes at least one component of the light forming a display image of the display unit 110.

A light outgoing from the display unit 110 (namely, the light forming a display image of the display unit 110) becomes a straightway polarization having a vibration surface in parallel with the polarized-light transmitting axis of the polarizing plate 111 by the polarizing plate 111 of the display unit 120. Accordingly, the straightway polarization is transmitted through the reflective polarizing plate 121 and entered into the liquid crystal panel 122. Since the vibration surface of the straightway polarization is rotated by ninety (90) degrees by passing through the liquid crystal panel 122, the straightway polarization is transmitted through the polarizing plate 123 after passing through the liquid crystal panel 122, and emitted to the observation side. Accordingly, the display image formed by the display unit 110 is transmitted through the display switching unit 120 as it is, and it becomes visible (display mode).

When an electric field of a predetermined threshold or more is applied to the liquid crystal layer 122c in the liquid crystal panel 122, the liquid crystal panel 122 loses the optical rotation for the light transmitted in the direction of the optical axis, since the liquid crystal within the liquid crystal layer 122c is released from the twist state. Accordingly, in this case, when an outside light enters into the display switching unit 120, the straightway polarization, generated by passing through the polarizing plate 123 in the same way as mentioned above, passes through the liquid crystal panel 122 without changing the vibration surface, and therefore, it is reflected by the reflective polarizing plate 121. Since the reflective light passes through the liquid crystal panel 122 again without changing its vibration surface, it is transmitted through the polarizing plate 123 as it is and becomes visible.

The light outgoing from the display unit 110 is a straightway polarization having a vibration surface in parallel with the polarized-light transmitting axis of the polarizing plate 111 in the same way as mentioned above. Since it passes through the reflective polarizing plate 121 of the display switching unit 120 as it is and passes through the liquid crystal panel 122 without changing its vibration surface, it is absorbed by the polarizing plate 123. Accordingly, the display image of the display unit 110 cannot be visibly recognized from the outside.

As mentioned above, since the liquid crystal panel 122 turns into a state that the electric field is applied in the display switching unit 120, a part of the outside light is reflected and the light entered from the display unit 110 is absorbed by the polarizing plate 123 and not visible from the outside, thereby turning the display screen into a mirror surface state (mirror mode).

Second Structural Example

Figure 2:
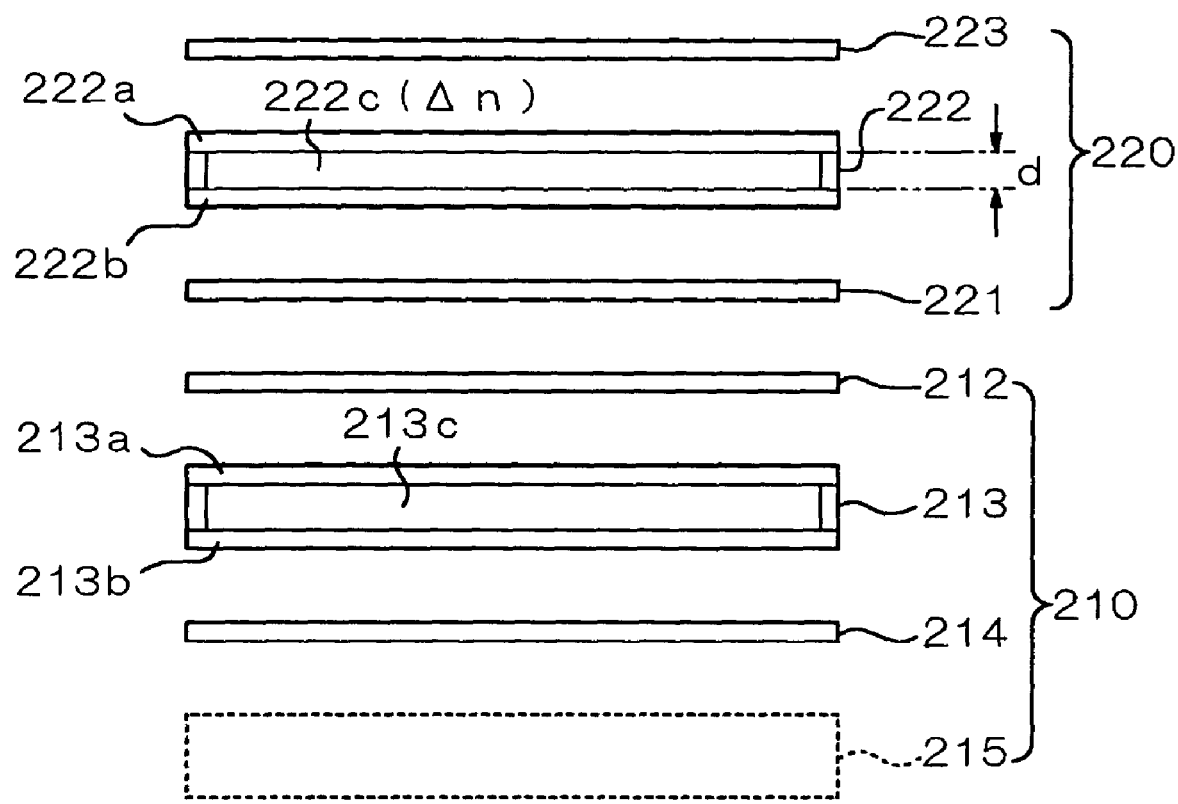
FIG. 2 is a schematic structure view showing a display device of the second structural example showing an example of the basic structure according to the invention.

A display device 200 of the second structural example according to the invention will be described. FIG. 2 is a schematic constitutional view showing the schematic structure of the display device 200.

The display device 200 comprises a display unit 210 and a display switching unit 220 similarly to the first structural example. The display unit 210 includes a retardation plate 221, a liquid crystal panel 213 (including substrates 213a, 213b, and a liquid crystal layer 213c), a polarizing plate 214, and a back light 215, similarly to the first structural example. In case of the display unit 210 designed as the reflective liquid crystal display device, the back light 215 is not necessary, like the first structural example. This example is different from the first structural example in that a polarizing plate is not provided on the observation side (the side of the display switching unit 220) of the liquid crystal panel 213 in the display unit 210.

The display switching unit 220 includes a reflective polarizing plate 221, a liquid crystal panel 222 (including substrates 222a, 222b, and a liquid crystal layer 222c), and a polarizing plate 223 from the side of the display unit 210 to the observation side, similarly to the first structural example. Since the relationship among these components and the contents of these components of the display switching unit 220 are completely identical to the first structural example, the description thereof is omitted.

Although the polarizing plate of the display unit 210 on the observation side is omitted in this example, the function of the polarizing plate can be achieved by the reflective polarizing plate 221 of the display switching unit 220. Namely, since the reflective polarizing plate 221 transmits a polarization component having a vibration surface in parallel with its polarized-light transmitting axis and reflects a polarization component having a vibration surface intersecting with the polarized-light transmitting axis (preferably at right angles), the same effect as that of the first structural example can be obtained basically when the polarized-light transmitting axis of the reflective polarizing plate 221 is arranged in substantially the same direction as the polarized-light transmitting axis of the polarizing plate that should be positioned at the observation side of the display unit 210. Accordingly, it is possible to obtain a display mode of the display unit 210 by the reflective polarizing plate 221 of the display switching unit 220, similarly to the first structural example, as well as to obtain a mirror mode by the reflective polarizing plate 221.

Third Structural Example

Figure 3:
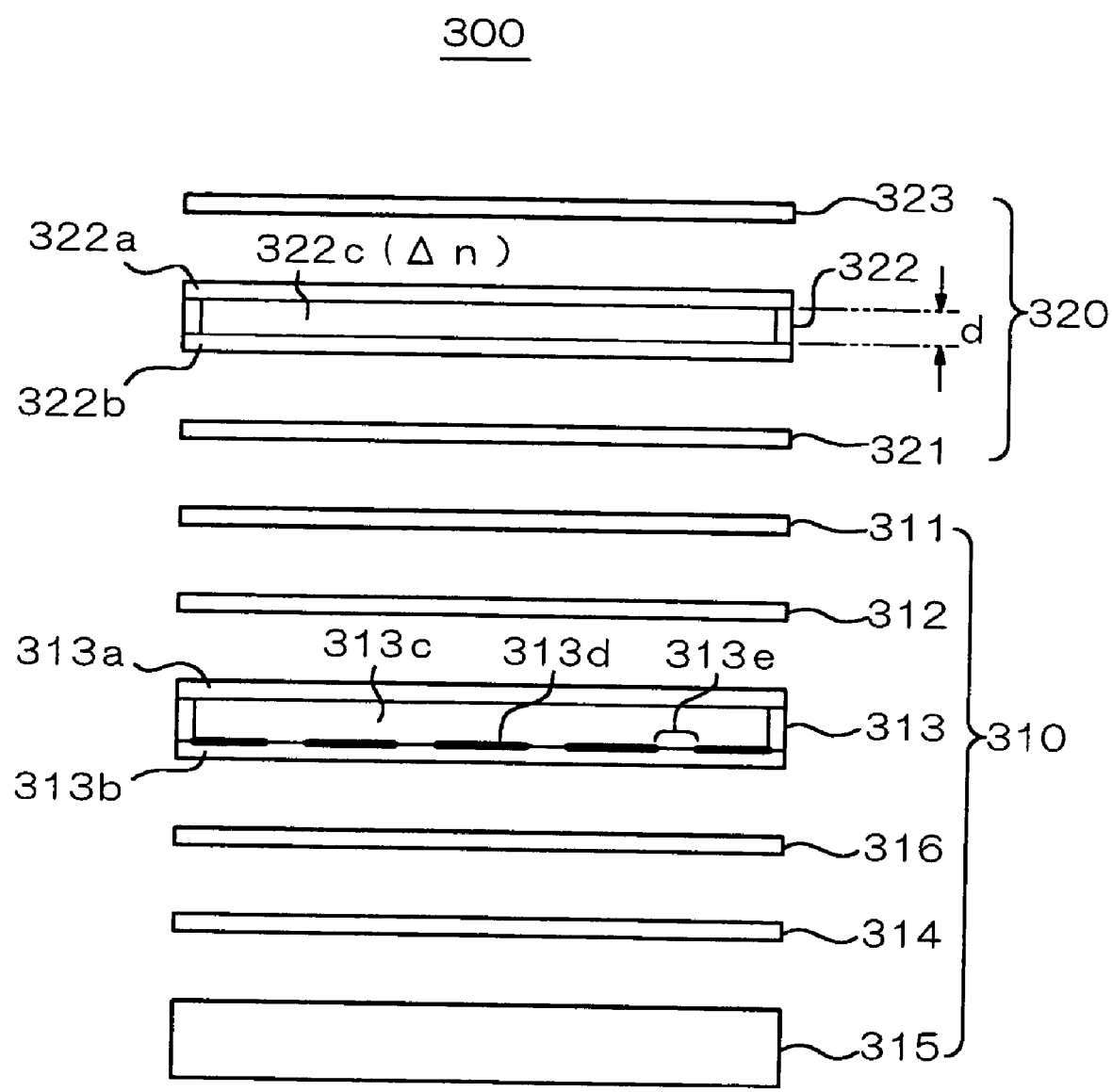
FIG. 3 is a schematic structure view showing a display device of the third structural example showing an example of the basic structure according to the invention.

A display device 300 of a third structural example according to the invention will be described with reference to FIG. 3. The display device 300 comprises a display unit 310 and a display switching unit 320 in the same way as mentioned above. Since the display switching unit 320 includes a reflective polarizing plate 321, a liquid crystal panel 322 (including substrates 322a, 322b, and a liquid crystal layer 322c), and a polarizing plate 323, similarly to the above respective examples, the description thereof is omitted.

This structural example is different from the above respective examples in that the display unit 310 is formed by a reflective semi-transmissive liquid crystal display device. The display unit 310 includes a polarizing plate 311, a retardation plate 312, a liquid crystal panel 313, a retardation plate 316, a polarizing plate 314, and a back light 315 disposed in this order from the side of the display switching unit 320.

The liquid crystal panel 313 includes a liquid crystal layer 313c interposed between two substrates 313a and 313b. A reflective layer 313d is formed on the inner surface of the substrate 313b (namely, the substrate opposite to the observation side) on the side of the back light 315. The reflective layer 313d is formed by a thin film made from reflective material such as aluminum and silver, or their alloys. The reflective layer 313d is provided with an aperture 313e for every pixel for forming a display image. A light entered into the liquid crystal panel 313 from the observation side is reflected by the reflective layer 313d, and the light entered from the back light 315 is transmitted through the aperture 313e.

In this display device 300, an outside light entered from the observation side (the side of the display switching unit 320) becomes a straightway polarization having a vibration surface in parallel with the polarized-light transmitting axis of the polarizing plate 311 by the polarizing plate 311, and after passing through the retardation plate 312 and entering into the liquid crystal panel 313, it is transmitted through the liquid crystal layer 313c and reflected by the reflective layer 313d. The reflective light is transmitted through the liquid crystal layer 313c again and transmitted through the retardation plate 312, and then entered into the polarizing plate 311. The polarization state of the light entered into the polarizing plate 311 is changed according to the voltage application state of the liquid crystal layer 313c, and according to the changed state, whether it is transmitted through the polarizing plate 311 or absorbed by the polarizing plate 311 is determined.

The light emitted from the back light 315 passes through the polarizing plate 314 and becomes a straightway polarization having a vibration surface in parallel with the polarized-light transmitting axis thereof, passing through the retardation plate 316 and entering into the liquid crystal layer 313c through the aperture 313e of the liquid crystal panel 313. The light passing through the liquid crystal layer 313c enters into the polarizing plate 311 after passing through the retardation plate 312.

The polarization state of the light incident to the polarizing plate 311 is changed according to the voltage application state of the liquid crystal layer 313c, and whether it is transmitted through the polarizing plate 311 or absorbed by the polarizing plate 311 is determined according to the changed state.

Also in this example, whether the display switching unit 320 is in a transmissive state or a reflective state, is determined by the voltage value or the presence of the voltage applied to the liquid crystal layer 322c within the liquid crystal panel 322. Accordingly, when the display switching unit 320 is in a transmissive state, the display image formed on the display unit 310 can be visibly recognized. The display image is formed as a reflective display when it is bright in the surroundings without help of the back light 315, while it is formed as a transmissive display when it is dark in the surroundings by the light of the back light 315.

Fourth Structural Example

Figure 4:
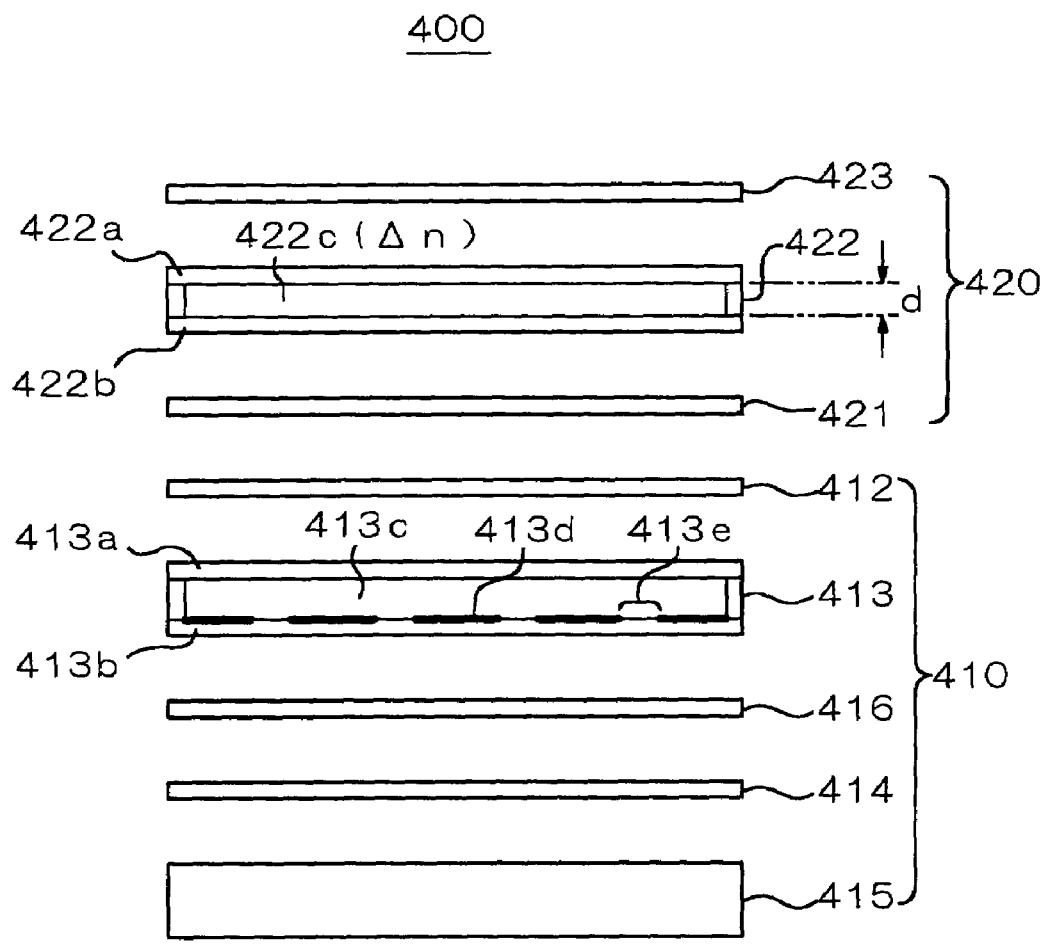
FIG. 4 is a schematic structure view showing a display device of the fourth structural example showing an example of the basic structure according to the invention.

A display device 400 of a fourth structural example according to the invention will be described with reference to FIG. 4. The display device 400 comprises a display unit 410 and a display switching unit 420 similarly to the above respective examples. Since the display switching unit 420 in this example includes a reflective polarizing plate 421, a liquid crystal panel 422 (including substrates 422a, 422b, and a liquid crystal layer 422c), and a polarizing plate 423, similarly to the above respective examples, the description thereof is omitted.

The display unit 410 includes a retardation plate 412, a liquid crystal panel 413, a retardation plate 416, a polarizing plate 414, and a back light 415, similarly to the above third example. The liquid crystal panel 413 includes substrates 413a and 413b, a liquid crystal layer 413c, a reflective layer 413d, and an aperture 413e, similarly to the above third example. This display unit 410, however, is different from that of the above third example in that the polarizing plate provided in the third example is not provided on the observation side (the side of the display switching unit 420). The display device 400 is designed to direct the polarized-light transmitting axis of the reflective polarizing plate 421 of the display switching unit 420 toward the direction coincident with the polarized-light transmitting axis of the polarizing plate to be positioned on the observation side of the display unit 410.

Although the polarizing plate on the observation side is not disposed in the display unit 410, the function of the polarizing plate can be achieved by the reflective polarizing plate 421 in the display switching unit 420, similarly to the second example, and therefore, the same function and effect as those of the above third example can be achieved.

Although the basic structural examples that can be used for the embodiments of the invention have been described, the above structural examples 1 to 4 are only examples and actually various modifications can be made without departing from the sprit of the invention with the essential components of the invention provided there.

First Embodiment

Figure 5:
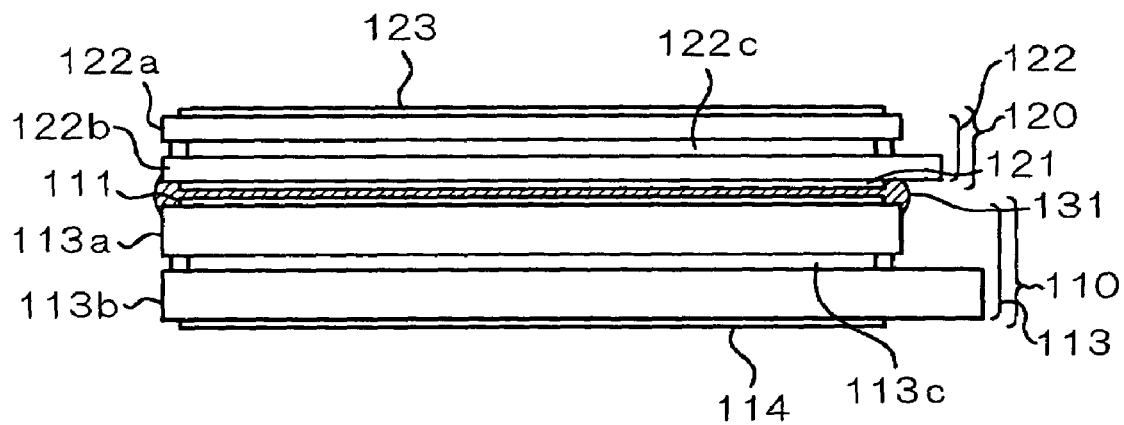
FIG. 5 is a schematic cross sectional view showing the structure of the first embodiment of the invention.

A display device according to a first embodiment of the invention will be described with reference to FIG. 5. This first embodiment is formed based on the first structural example, and in FIG. 5, non-essential components (for example, retardation plate and back light) are properly omitted, and the same reference marks are attached to the corresponding components of the first structural example.

In this embodiment, in the display unit 110, the polarizing plate 111, the liquid crystal panel 113, and the polarizing plate 114 are mutually held together in an integral way, and in the display switching unit 120, the reflective polarizing plate 121, the liquid crystal panel 122, and the polarizing plate 123 are mutually held together in an integral way. The integrated portion of the display unit 110 and the integrated portion of the display switching unit 120 are optically adhered to each other by an adhesive layer 131. Optical adhesion means that the display unit 110 is adhered to the display switching unit 120 in substantially the same state as in case where nothing exists optically therebetween. Here, adhesion means that the display unit 110 is directly or indirectly in contact with the display switching unit 120 in a way capable of mutually supporting each other.

The adhesive layer 131 is basically made from a transparent material having a good transmittance (for example, 90% and more) all over the whole visible light region, and the refractive index of the adhesive layer 131 is selected to reduce most of the reflection in the boundary between the top surface of the display unit 110 and the rear surface of the display switching unit 120.

It is preferable that the refractive index of the adhesive layer 131 is within the range of 1.30 to 1.50. When the refractive index is not within this range, the reflection is increased in the boundary between the polarizing plate 111 and the reflective polarizing plate 121, or the glass substrates of the liquid crystal panel, thereby deteriorating the display quality. In this case, it is preferable that the thickness of the adhesive layer 131 is 100 μm or less.

The adhesive layer 131 is made from an adhesive such as epoxy resin or acrylic resin. Especially, as the material forming the adhesive layer 131, a gel material is preferable. By forming the adhesive layer 131 with the gel material, the display unit 110 and the display switching unit 120 are adhered to each other in a relatively movable way, therefore, it is possible to absorb a stress occurring between both of them, caused by a difference in coefficient of thermal expansion and rigidity, and it is also possible to restrain the panel from being damaged even when the liquid crystal panel is made from a fragile material such as glass, thereby enhancing the robustness.

Although the first embodiment has been described according to the first structural example as mentioned above, it may be formed according to one of the above second to fourth structural examples. Alternatively, another structure other than the above structural examples may be adopted, as far as it includes the essential components of the invention.

Second Embodiment

Figure 6:
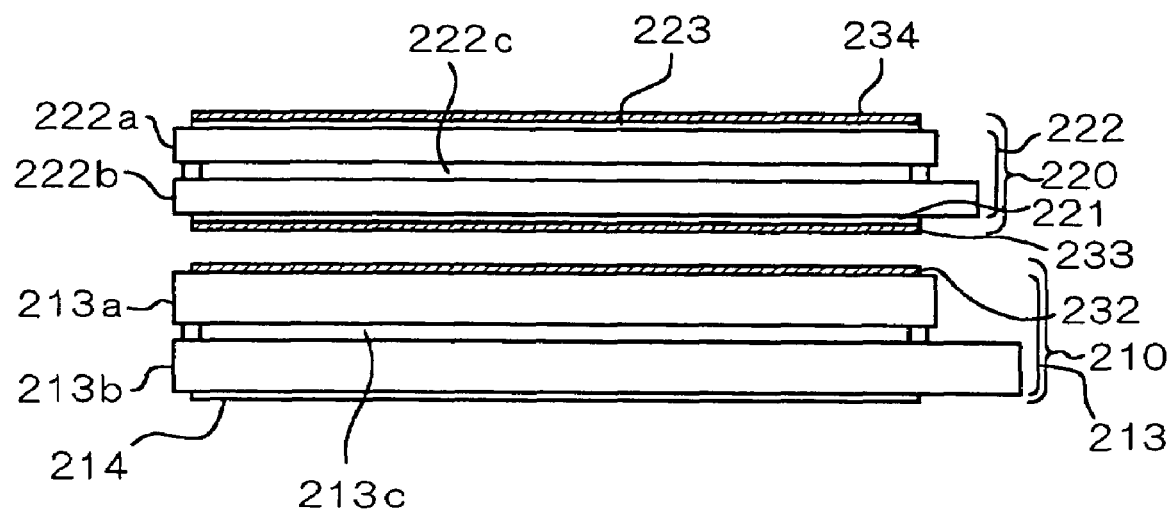
FIG. 6 is a schematic cross sectional view showing the structure of the second embodiment of the invention.

A display device according to a second embodiment of the invention will be described with reference to FIG. 6. The second embodiment is formed according to the second structural example as mentioned above. In this embodiment, the display unit 210 is not optically adhered to the display switching unit 220 (i.e., they are separated from each other), but they are firmly supported by a case or the like (not illustrated).

In the embodiment, an anti-reflection coating 232 is formed on the surface of the display unit 210 on the side of the display switching unit 220, and an anti-reflection coating 233 is formed on the surface of the display switching unit 220 on the side of the display unit 210. Further, an anti-reflection coating 234 is formed on the surface of the display switching unit 220 on the side opposite to the display unit 210 (on the observation side).

The above anti-reflection coatings (AR coatings) 232, 233, and 234 are formed by a single layer film coated in about one quarter (¼) thickness of the wavelength of the visible light region by evaporation method or the like, and a multi-layer film of alternately laminating A-layer and B-layer that are different in refraction index and have the thickness of about one quarter (¼) of the wavelength of the visible light region. In case of a multi-layer film, by changing the thickness of the A-layer and the B-layer little by little, it is possible to extremely reduce the refraction index over the wide range of the visible light region. As the material forming the anti-reflection coating, an inorganic compound including magnesium fluoride and silicon dioxide, and an organic compound including acrylic resin and epoxy resin can be used, and a film can be formed by evaporation, sputtering, and CVD methods.

In the embodiment, in a display mode where a light outgoing from the display unit 210 can be transmitted through the display switching unit 220 and visible, it is possible to restrain the display quality from deteriorating, such as reducing the contrast and reducing the brightness of the display, caused by reflection of an outside light on the surface of the observation side of the display switching unit 220, reflection of an outside light on the surface of the display unit 210 on the side of the display switching unit 220, and reflection of a display light on the surface of the display switching unit 220 on the side of the display unit 210.

Although the second embodiment has been described according to the second structural example as mentioned above, it may be formed according to any example of the first, third and fourth structural examples. Another structure other than the above structural examples may be adopted for this embodiment, as far as it includes the essential components of the invention.

Third Embodiment

A third embodiment according to the invention will be described with reference to FIG. 7. The embodiment is formed according to the first structural example. In the embodiment, two regions 120A and 120B are provided in the display switching unit 120. In the region 120A, single electrodes 122d and 122e for applying an electric field to the liquid crystal layer 122c are formed entirely on the inner surfaces of the substrates 122a and 122b of the liquid crystal panel 122, and a single pixel is formed in the region 120A by these electrodes 122d and 122e. On the contrary, a plurality of electrodes 122f and 122g, smaller than the electrodes provided in the region 120A, are arranged in the region 120B, and a plurality of pixels are arranged there. Accordingly, in the region 120A, the optical state of the liquid crystal layer 122c is switched by the entire block, while in the region 120B, the optical state of the liquid crystal layer 122c can be controlled for every pixel formed by a plurality of the electrodes 122f and 122g. Therefore, in the region 120B, a desired display is possible by switching a display mode and a mirror mode by controlling each of the plural pixels.

The plural pixels within the region 120B may be formed in a so-called dot-matrix shape, or they may be formed in a segment shape having a specific plane shape. In any case, in the display switching unit 120, a display condition different from that of the display unit 110 can be displayed, namely, a display condition different from that of the display unit 110 can be realized by switching the display mode and the mirror mode, and a display apparently formed on a different position from the display unit 110 can be realized because of a display on the display switching unit positioned nearer to the observation side than the display unit. Therefore, it is possible to expand the variation of the display condition on a display screen.

Figure 7:
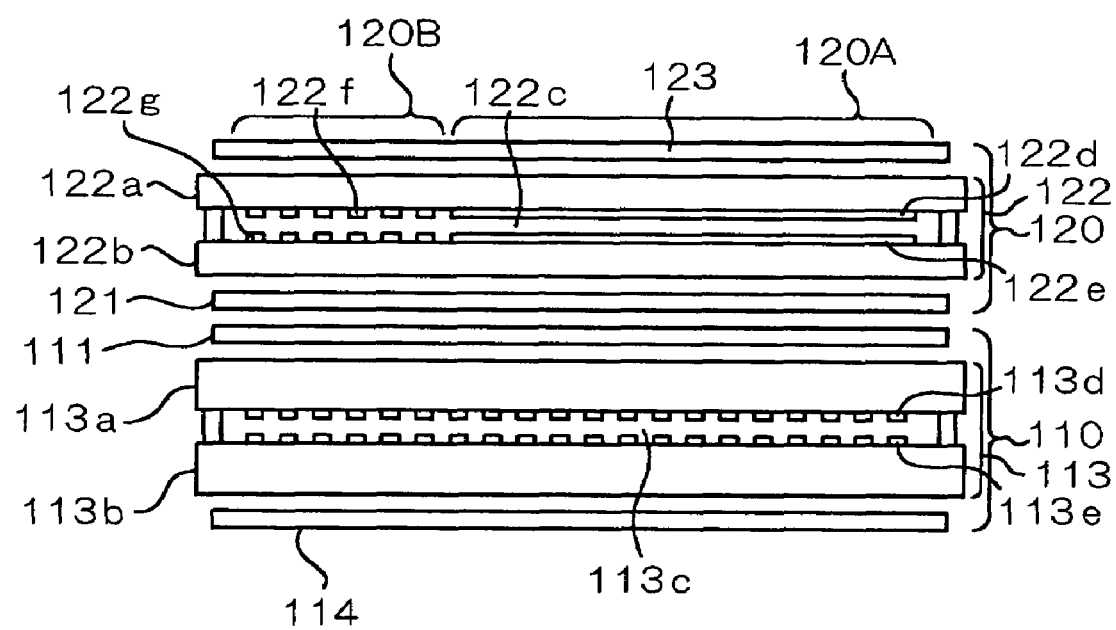
FIG. 7 is a schematic cross sectional view showing the structure of the third embodiment of the invention.

In the liquid crystal panel 113 provided in the display unit 110 as shown in FIG. 7, a plurality of electrodes 113d and 113e are arranged on the inner surfaces of the substrates 113a and 113b, thereby arranging a plurality of pixels in a dot-matrix shape.

In FIG. 7, the electrodes 113f and 113g and the electrodes 122f and 122g are shown schematically, and actually various structures can be adopted depending on the structure of the liquid crystal panel 122. For example, when adopting a passive matrix-type panel structure, the electrode 122f and the electrode 122g mutually intersect with right angles relative to each other and a pixel region is formed on the intersecting plane portion. When adopting an active matrix-type panel structure, there is a case of forming a pixel electrode independently for every pixel on the inner surface of one substrate.

Although the third embodiment has been described according to the first structural example as mentioned above, it may be formed based on any example of the second to the fourth structural examples. Another structure other than the above examples may be adopted, as far as it includes the essential components of the invention.

Fourth Embodiment

Figure 8:
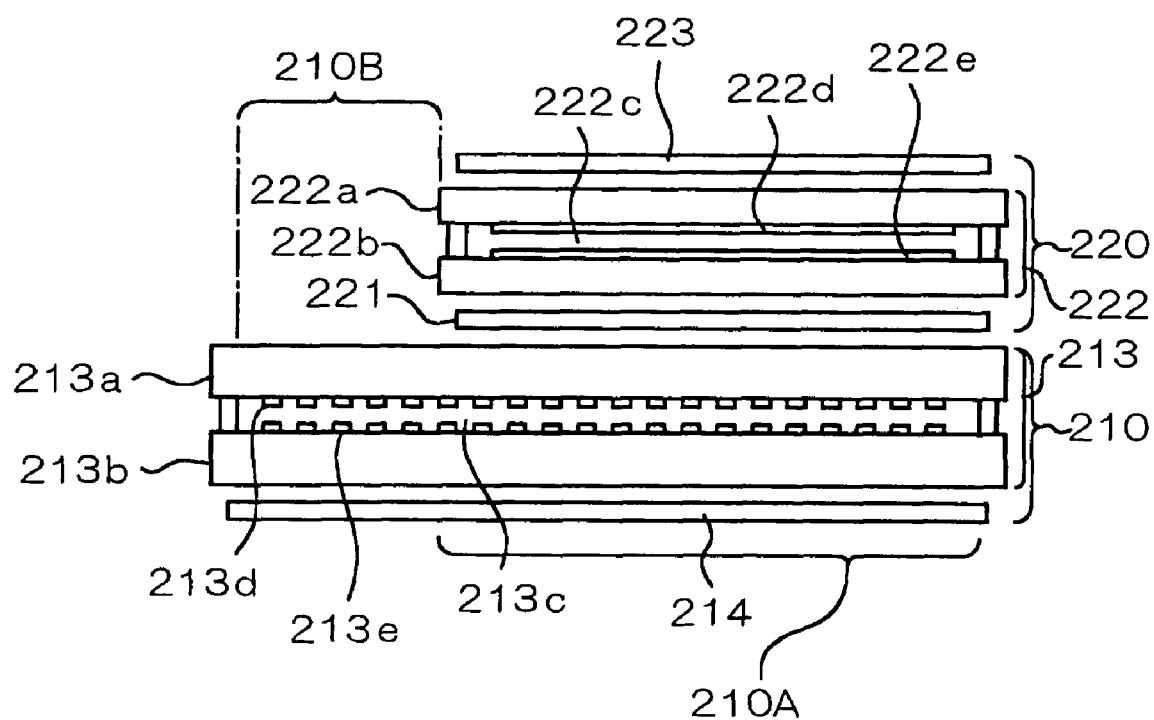
FIG. 8 is a schematic cross sectional view showing the structure of the fourth embodiment of the invention.

A display device of a fourth embodiment according to the invention will be described with reference to FIG. 8. This embodiment is shown according to the second structural example. In this embodiment, a region 210A overlapping with the display switching unit 220 two dimensionally, and a region 210B not overlapping with the display switching unit 220 are provided in the display unit 210. Accordingly, in the region 210B, the display unit 210 can be visibly recognized without viewing through the display switching unit 220.

In the liquid crystal panel 213 of the display unit 210, a plurality of electrodes 213d and 213e are arranged and a plurality of pixels are arranged in a dot-matrix shape. In the liquid crystal panel 222 of the display switching unit 220, single electrodes 222d and 222e are formed, and a single pixel is formed on the whole surface.

In this embodiment, since the display unit 210 is visible in the region 120B without viewing through the display switching unit 220, the contents displayed by the display unit 210 can be visibly recognized even if the display switching unit 220 is in a mirror state. Accordingly, it is possible to realize the mirror mode and the display mode at the same time, and it is possible to improve the visibility of the region 210B by providing the region 210B which can be visibly recognized directly without viewing through the display switching unit 220. For example, a finer pixel structure can be provided in the region 210B than in the region 210A, thereby a display condition with a larger amount of information in the more visible region 210B can be realized.

Although the second embodiment has been described according to the second structural example as mentioned above, it may be formed based on any example of the first, the third, and the fourth structural examples. Another structure other than the above examples may be adopted, as far as it includes the essential components of the invention.

Fifth Embodiment

Figure 9:
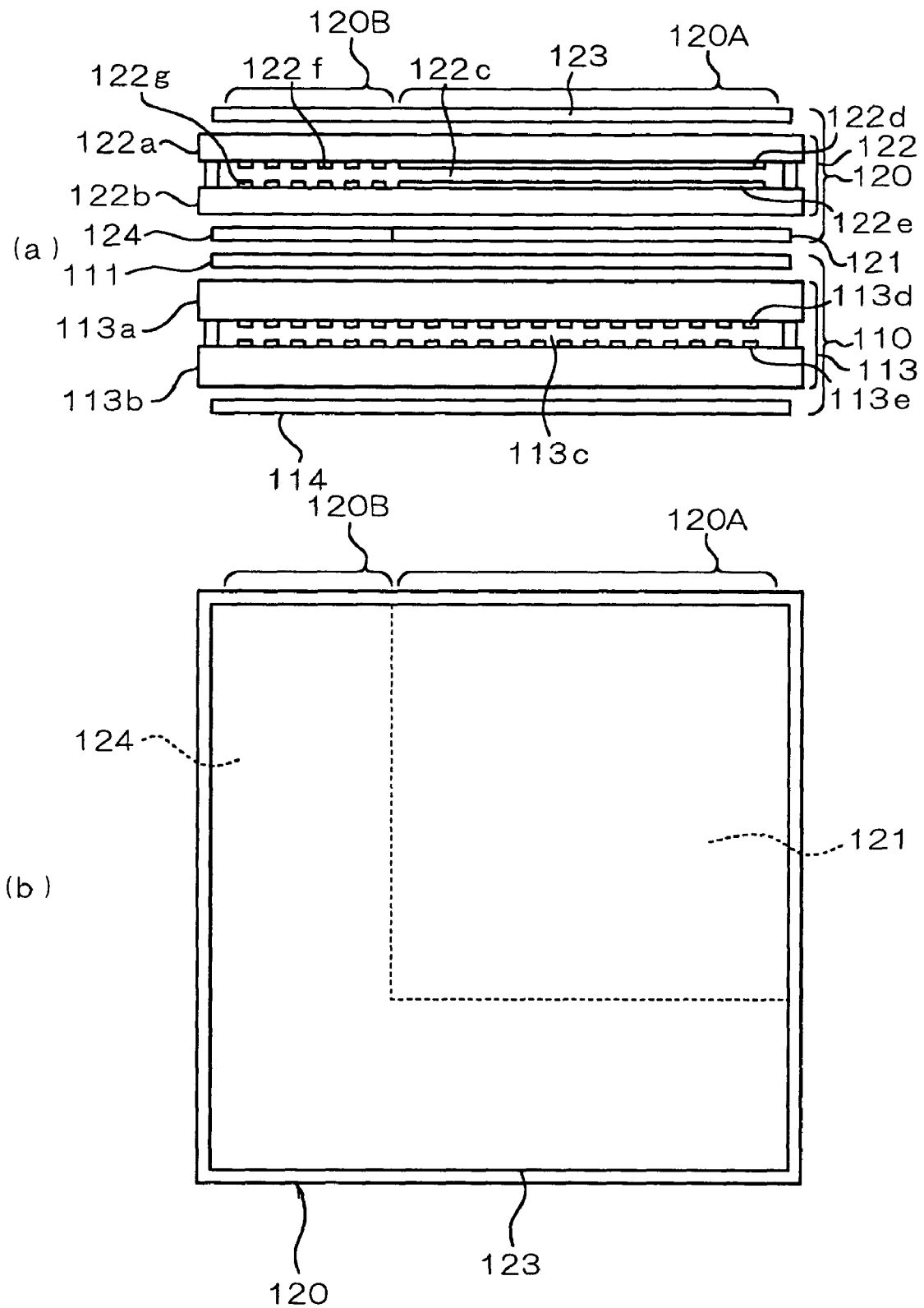
FIGS. 9(a) and 9(b) are a schematic cross sectional view and a schematic plan view showing the structure of the fifth embodiment of the invention.

A fifth embodiment according to the invention will be described with reference to FIG. 9. Since the embodiment basically has the same structure as the third embodiment, the same reference numerals are attached to the same components, and the description thereof is omitted.

This embodiment is different from the third embodiment in that a reflective polarizing plate 121, disposed in the display switching unit 120, doesn't cover the whole display screen but covers only in the region 120A where the single pixel is formed. Instead of the reflective polarizing plate 121, an absorptive polarizing plate 124 is disposed in the region 120B where a plurality of pixels are arranged. The polarizing plate 124 is arranged such that its polarized-light transmitting axis is positioned in the same direction as the polarized-light transmitting axis of the reflective polarizing plate 121. Namely, the polarizing plate 124 transmits a polarization component that the reflective polarizing plate 121 transmits, and absorbs a polarization component that the reflective polarizing plate 121 reflects.

Since the absorptive polarizing plate 124 is provided in the region 120B of the display switching unit 120, this embodiment has a function capable of switching a light emissive state and a light non-emissive state similarly to the usual liquid crystal display panel, and as a result, it is possible to realize the normal display condition, which is different from the switching operation of the display mode and the mirror mode in the region 120A. Since the region 120B may be designed so as to visibly recognize a display condition formed by the display switching unit 120, or a display condition formed by both the display unit 110 and the display switching unit 120, it is possible to expand variation of the display condition and the display position.

Although the fifth embodiment has been described according to the first structural example as mentioned above, it may be formed based on any example of the second to the fourth structural examples. Another structure other than the above examples may be adopted, as far as it includes the essential components of the invention.

Sixth Embodiment

Figure 10:
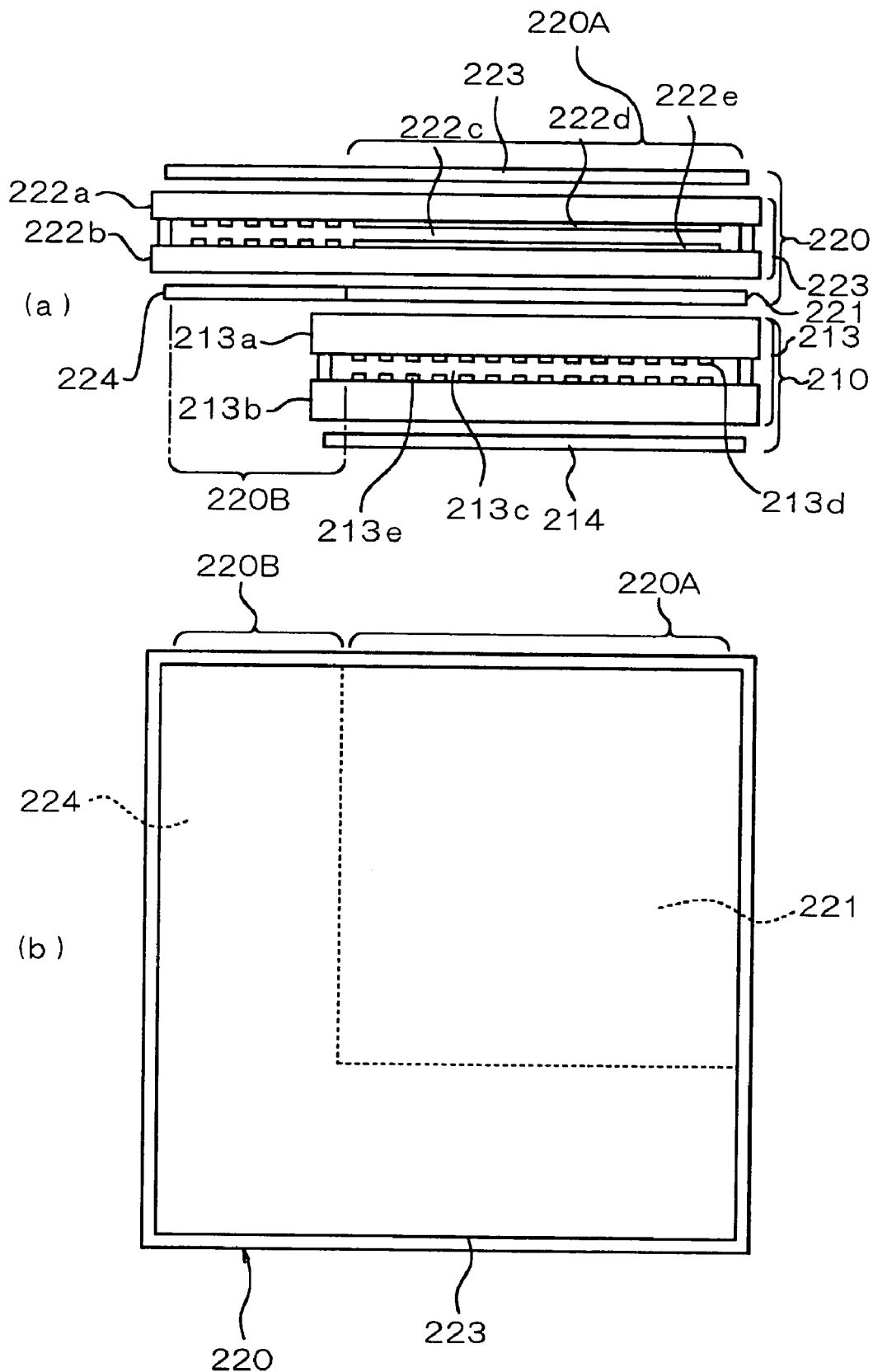
FIGS. 10(a) and 10(b) are a schematic cross sectional view and a schematic plan view showing the structure of the sixth embodiment of the invention.

A sixth embodiment according to the invention will be described with reference to FIG. 10. In this embodiment, a region 220A overlapping with the display unit 210 two dimensionally and a region 220B not overlapping with the display unit 210 two dimensionally are provided in the display switching unit 220. In the region 220A, a single pixel is formed by electrodes by forming 222d and 222e covering substantially the whole surface of the liquid crystal panel 222. While, in the region 220B, a plurality of pixels is arranged by forming a plurality of electrodes 222f and 222g there.

Similarly to the fifth embodiment, a reflective polarizing plate 221 is disposed in the region 220A, and an absorptive polarizing plate 224 is disposed in the region 220B, on the side of the display unit 210 of the liquid crystal panel 222. Even when the reflective polarizing plate 221 is designed to be disposed in the region 220B, it is possible to realize a display condition by the display switching unit 220 as well as a function described later, although the display condition is different.

Further, a liquid crystal panel 213, arranged with a plurality of pixels having a plurality of electrodes 213d and 213e, is provided in the display unit 210, formed in the same way as those of the third to the fifth embodiments except the portion not facing the display switching unit 220.

In this embodiment, the region 220A functions in the same way as those of the above respective examples. In the region 220B, however, only the display switching unit 220 includes the polarizing plate 224 and the display unit 210 doesn't include it, therefore, the portion within the region 220B of the display switching unit 220 including the polarizing plate 224 functions as a display body. In case of the drawing, the region 220B forms a transmissive liquid crystal display body. This embodiment can realize a display condition in the region 220B, which is independent of the portion of the region 220A.

Seventh Embodiment

A seventh embodiment according to the invention will be described with reference to FIG. 11. As illustrated in FIG. 11(b), in a display device 600 of the seventh embodiment, the polarization converting means 630 is interposed between the display unit 610 and the display switching unit 620. The display device 600 can be constituted in the same way as those of the first to the fourth structural examples and the first to the sixth embodiments, except that the polarization converting means 630 is disposed, and further, another structure having the essential components of the invention can be adopted.

In this embodiment, a polarization component emitted from the display unit 610 is converted into a different polarized state by the polarization converting means 630, and the converted polarization enters into the display switching unit 620. The display switching unit 620 is formed to be switchable between a transmissive state of the light emitted from the display unit 610 and an outwardly-reflective state of the light entered from the outside, by switching the optical state of the liquid crystal panel 622. Thus, by using the function of the display switching unit 620, the display mode, capable of recognizing a display condition of the display unit 610 visibly, and the mirror state, capable of recognizing the mirror mode visibly, can be realized in a switchable way.

The function and effect of this embodiment will be described by comparison with the display device 500 having no polarization converting means 630. For the sake of brief description, assume that light components emitted from the display units 510 and 610 are straightway polarizations and that the liquid crystal panels 522 and 622 of the display switching units 520 and 620 can be switched between a state of rotating the polarization direction by ninety (90) degrees and a state of not changing the polarization state. Further, assume that the polarization converting means is a retardation plate of a half (½) wavelength.

Substantially similarly to the contents described above, in the display device 500, in a display mode, a first polarization component that is a straightway polarization emitted from the display unit 510 is transmitted through the reflective polarizing plate 521 and entered into the liquid crystal panel 522 as it is, and the direction of the polarization vibration surface is rotated by ninety (90) degrees by the liquid crystal panel 522, hence to be a second polarization component that is a straightway polarization, and it is transmitted through the polarizing plate 523, and is visibly recognized.

In the mirror mode, when an outside light enters, it becomes the second polarization component that is a straightway polarization by passing through the polarizing plate 523, and since the polarized state of the second polarization component is not changed even after passing through the liquid crystal panel 522, it is reflected by the reflective polarizing plate 521, and emitted from the polarizing plate 523 after passing through the liquid crystal panel 522 again.

In the display device 500, the light emitted from the device is the second polarization component (a straightway polarization having a vibration surface in parallel with the paper of the drawing) even in any mode of the display mode and the mirror mode.

In addition to the structure of the display device 500, the above mentioned polarization converting means 630 is provided in the display device 600, and the display device 600 is different from the display device 500 in that the polarized-light transmitting axis of the reflective polarizing plate 621 intersects with the polarized-light transmitting axis of the reflective polarizing plate 521 at right angles and that the polarized-light transmitting axis of the polarizing plate 623 intersects with the polarized-light transmitting axis of the polarizing plate 523 at right angles. Namely, the display switching unit 620 of the display device is disposed in a state of rotating the display switching unit 520 of the display device 500 by ninety (90) degrees around the light axis.

In a display mode, a first polarization component, emitted from the display unit 610, is transmitted through the polarization converting means 630 (a half (½) wavelength plate), and the first polarization component is converted into a second polarization component having a vibration surface intersecting with the first polarization component at right angles. The second polarization component is transmitted through the reflective polarizing plate 621 and converted into the first polarization component with its vibration surface rotated by ninety (90) degrees in the liquid crystal panel 622, and the first polarization component is transmitted through the polarizing plate 623, and visibly recognized.

In the mirror mode, when an outside light enters, it becomes the first polarization component that is a straightway polarization by passing through the polarizing plate 623, and since the polarized state of the first polarization component is not changed even after passing through the liquid crystal panel 622, it is reflected by the reflective polarizing plate 621, and emitted from the polarizing plate 623 after passing through the liquid crystal panel 622 again.

In the display device 600, the light emitted from the device is the first polarization component (a straightway polarization having a vibration surface intersecting at right angles with the paper of the drawing) even in any mode of the display mode and the mirror mode. Namely, the light emitted from the display device 600 of this embodiment has its vibration surface rotated by ninety (90) degrees, compared with the polarization emitted from the display device 500.

Generally, in this embodiment, by providing the polarization converting means 630, it is possible to change the relative position of the display unit 610 and the display switching unit 620, and as a result, it is possible to change the state of the polarization emitted from the display unit 610 and the display switching unit 620 while keeping the same function, that is, the function before changing the position. Thus, it is possible to change a light, emitted from the display device, from the straightway polarization having a vibration surface of horizontal or at the approximate angle to the straightway polarization having a vibration surface of vertical or at the approximate angle, without changing the position of the display unit 610, so that, for example, even a person wearing polarization sunglasses can visibly recognize the display mode and the mirror mode. Accordingly, it becomes very easy to change the structure of the display device.

The same characteristic structure shown in the above first to the sixth embodiments can be adopted also for this embodiment.

Eighth Embodiment

Figure 12:
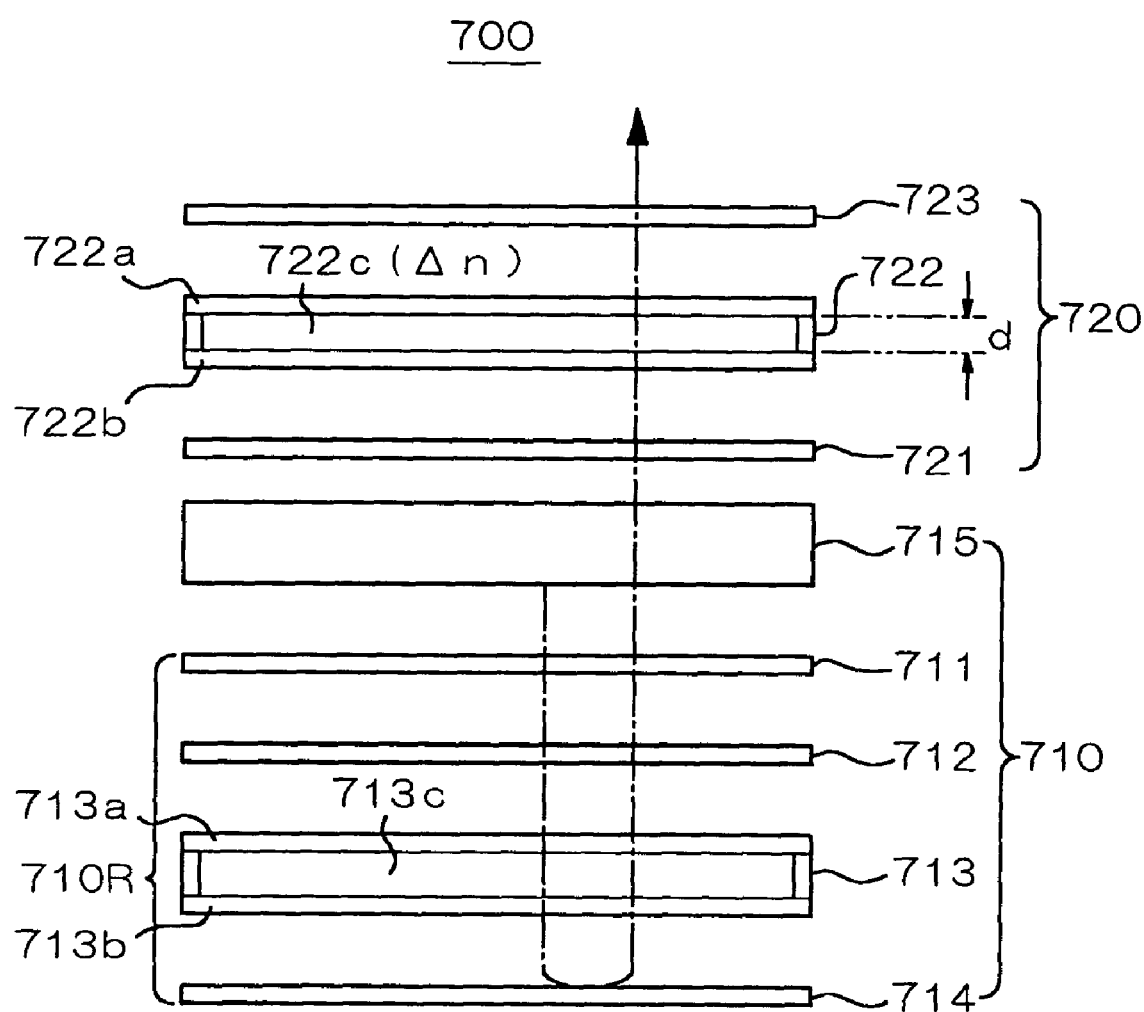
FIG. 12 is a schematic cross sectional view showing the structure of the eighth embodiment according to the invention.

With reference to FIG. 12, the display device 700 of an eighth embodiment according to the invention will be described. Although the display switching unit 720, constituted in the same way as in the above respective examples and embodiments, is provided in the display device 700 of this embodiment, the structure of the display unit 710 is a little different. The display unit 710 has a reflective display device 110R comprised by a polarizing plate 711, a retardation plate 712, a liquid crystal panel 713, and a reflective plate 714, and a front light 715, interposed between the reflective display device 110R and the display switching unit 720. The reflective display device 110R can be formed by the various well-known reflective liquid crystal display devices. The polarizing plate 711 and the liquid crystal panel 713 are constituted in substantially the same way as those of the first structural example.

Figure 15:
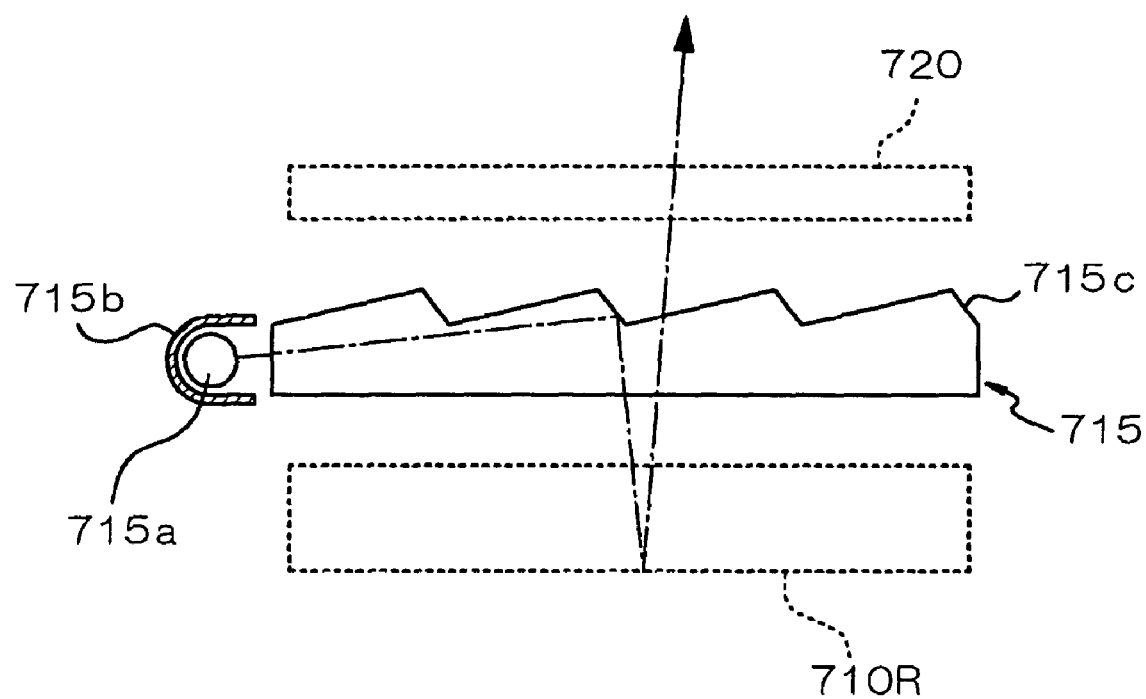
FIG. 15 is a schematic cross sectional view showing the structural example including a front light of the eighth embodiment.

The front light 715 has a light source 715a including a LED and a cold cathode tube, as illustrated in FIG. 15. A reflective plate 715b is disposed around the light source 715a. A light guide plate 715c is disposed next to the light source 715a. The reflective plate 715b has a function of concentrating the light of the light source 715a toward the light guide plate 715c. The light emitted from the light source 715a enters the end surface of the light guide plate 715c, and the incident light (a light having a high incident angle with respect to the light axis of the device) is substantially uniformly radiated toward the reflective display device 710R from the interior of the light guide plate 715c. The light incident, entered again into the light guide plate 715c after being reflected by the reflective display device 710R (a light having a low incident angle with respect to the light axis of the device), is transmitted through the light guide plate 715c as it is, and entered into the display switching unit 720.

Because the front light 715, an illumination device, is provided in the display unit 710 on the observation side (on the side of the display switching unit 720), and the reflective display device 710R is provided on the opposite side to the observation side of the front light 715 in this embodiment, a display condition by using only an outside light and a display condition by using the front light 715 can be realized even if the display unit 710 does not have the reflective semi-transmissive structure (a complicated and expensive structure) like the third structural example and the fourth structural example.

The same characteristic structure as shown in the first to the seventh embodiments can be adopted also for this embodiment.

Ninth Embodiment

The structure of a ninth embodiment according to the invention will be described. This embodiment can be applied to the above respective structural examples and embodiments in common and it can be also applied to another structure having the essential components of the invention similarly. In the description below, an example of applying this embodiment to the display device 100 of the first structural example will be described.

In this embodiment, the liquid crystal panel 122 of the display switching unit 120 in the display device 100 shown in FIG. 1 is formed by a TN liquid crystal panel, namely, by a nematic liquid crystal with the liquid crystal layer 122c twisted by ninety (90) degrees in the thickness direction. In this case, the liquid crystal layer 122c has an optical rotation of rotating the vibration surface of the straightway polarization by ninety (90) degrees. However, as the thickness of the liquid crystal layer 122c is decreased, the polarization direction of the incident light cannot follow the twisting of the liquid crystal, and the transmitted light may be colored by the optical rotary dispersion effect. Therefore, by providing the display switching unit 120 on the observation side of the display unit 110, a display image displayed by the display unit 10 is colored and the mirror surface in the mirror mode, realized by the display switching unit 120, is also colored.

Here, the thickness of the liquid crystal layer 122c is increased to some degree, and especially when $\Delta n \cdot d = 0.7$ μm or more, the coloring by the optical rotary dispersion becomes less as $\Delta n \cdot d$ becomes larger. Since the thickness of a cell becomes larger as the $\Delta n \cdot d$ becomes larger, the threshold voltage (Vth) is increased, the response speed becomes slower, and the amount of liquid crystal used is increased, thereby causing disadvantages such as decreasing productivity. Taking these points into consideration, it is preferable that $\Delta n \cdot d$ is 1.7 μm or less.

Since the viewing angle characteristic is comparatively good in the range of 0.50 μm to 0.65 μm in $\Delta n \cdot d$, the viewing angle can be restrained from narrowing even when the display switching unit 120 is disposed on the observation side of the display unit 110.

Figure 13:
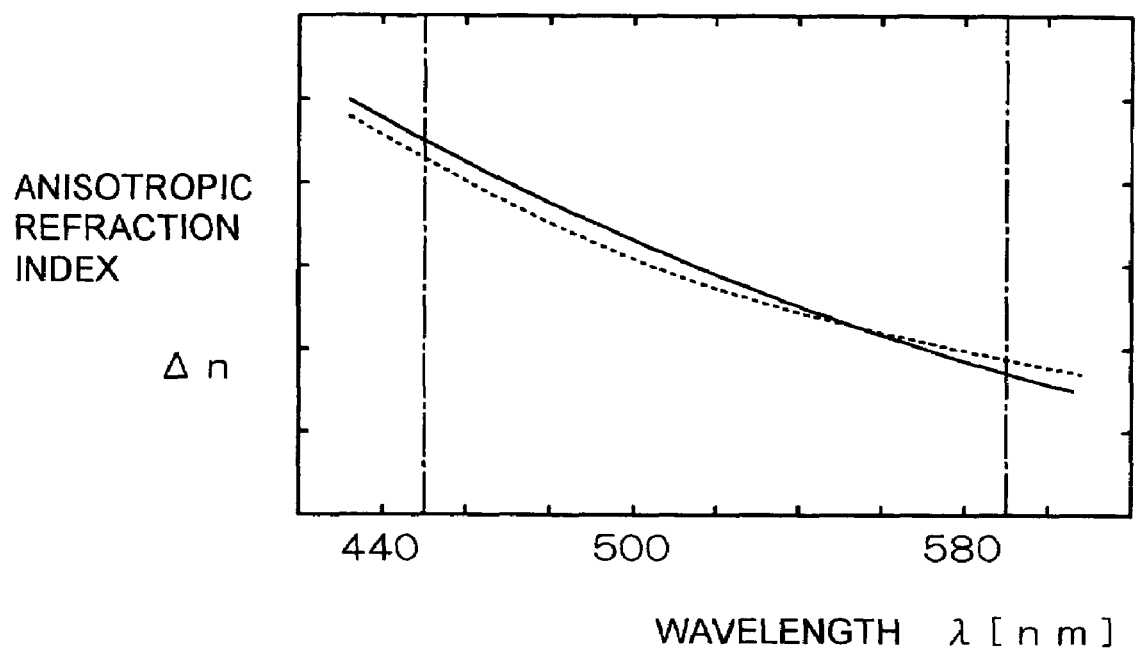
FIG. 13 is a graph showing a relationship between wavelength and antisotropic refraction index of liquid crystal.

FIG. 13 shows wavelength distribution in the visible light region of the anisotropic refraction index $\Delta n$ of the liquid crystal forming the liquid crystal layer 122c of the liquid crystal panel 122. As apparent from this graph, the anisotropic refraction index $\Delta n$ also varies in the visible light region, corresponding to the wavelength $\lambda$. In this embodiment, in the display switching unit 120, a parameter $\alpha_m = \Delta n_m$ ($\lambda = 450$ nm)/$\Delta n_m$ ($\lambda = 590$ nm) indicating the degree of the wavelength distribution in the liquid crystal within the liquid crystal panel 122c is defined. $\Delta n_m(\lambda)$ means the anisotropic refraction index for the light of the wavelength $\lambda$. Further, in the display unit 110, a parameter $\alpha_d = \Delta n_d$ ($\lambda = 450$ nm)/$\Delta n_d$ ($\lambda = 590$ nm) indicating the degree of the wavelength distribution in the liquid crystal within the liquid crystal panel 113 is defined. $\Delta n_d(\lambda)$ means the anisotropic refraction index for the light of the wavelength $\lambda$. The parameter $\alpha$ is about 1 to 1.3 for generally used liquid crystal.

In this embodiment, the ratio of $\alpha_m$ and $\alpha_d$, namely $\alpha_m/\alpha_d$ is a value within the rage of 0.9 to 1.1. This value shows that the wavelength distribution within the visible light region of the liquid crystal panel 122 of the display switching unit 120 and the wavelength distribution within the visible light region of the liquid crystal panel 113 of the display unit 110 have almost the same inclination, therefore it is possible to restrain the change of color reproducibility of a display image of the display unit 110 when the display switching unit 120 is added to the display unit 110. Accordingly, it is possible to restrain the coloring of white display in the display unit 110, especially.

Figure 14:
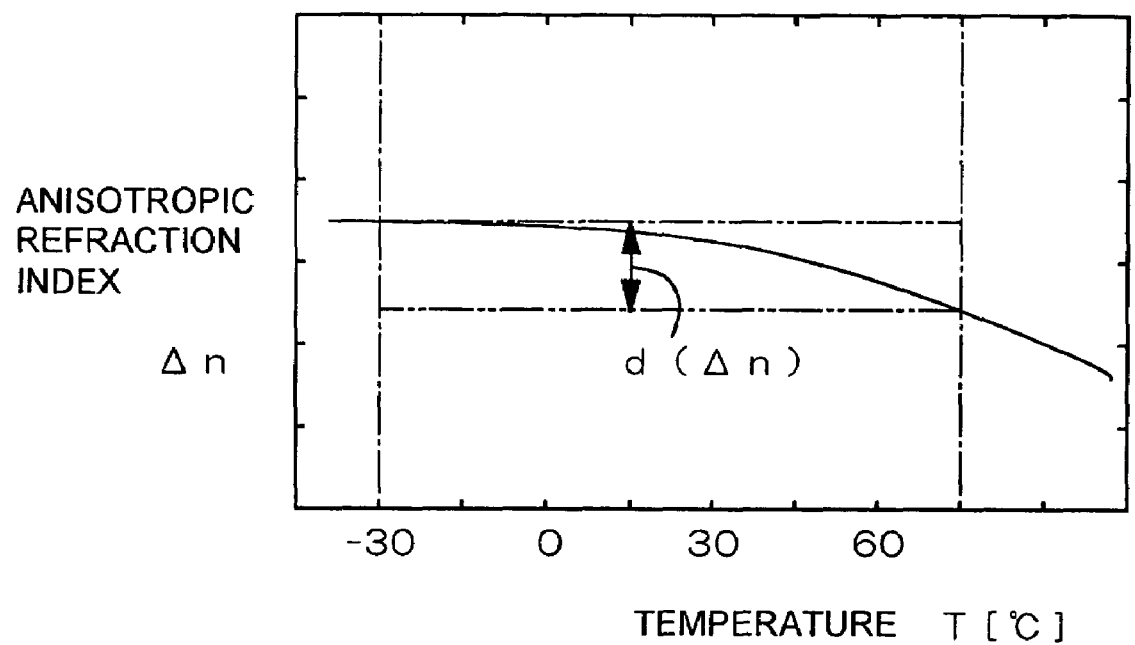
FIG. 14 is a graph showing a relationship between temperature and anisotropic fraction index of liquid crystal.

FIG. 14 shows temperature dependency of the anisotropic refraction index $\Delta n$ of the liquid crystal (nematic liquid crystal), forming the liquid crystal layer 122c of the liquid crystal panel 122 of the display switching unit 120. As apparent from this graph, within the range of $-30°$ C. to $70°$ C., the anisotropic refraction index $\Delta n$ is decreased gradually as the temperature is increased. In this embodiment, within the range of $=20°$ C. to $60°$ C., the variation range of the anisotropic refraction index $\Delta n$ should be within ±8%, namely, the variation range d ($\Delta n$) of the anisotropic refraction index $\Delta n$ should be within the range of ±8% for the medium value of $\Delta n$. This can be realized by selecting a material having a proper temperature characteristic among the known liquid crystal materials, and by blending several kinds of selected liquid crystal materials. When the variation amount is changed beyond 8%, the display characteristics such as color tone and contrast deteriorates rapidly. In this embodiment, however, in which the variation amount is set within the range, it is practically possible to restrain from decreasing the transmission of the display switching unit 120, caused by the temperature change, and it is also possible to restrain the change of visibility of a display condition affected by the display unit 110, and it is also possible to maintain the mirror surface characteristic in the mirror mode. Especially, by fixing the variation amount within ±5%, the display quality can be further improved.

Tenth Embodiment

Figure 16:
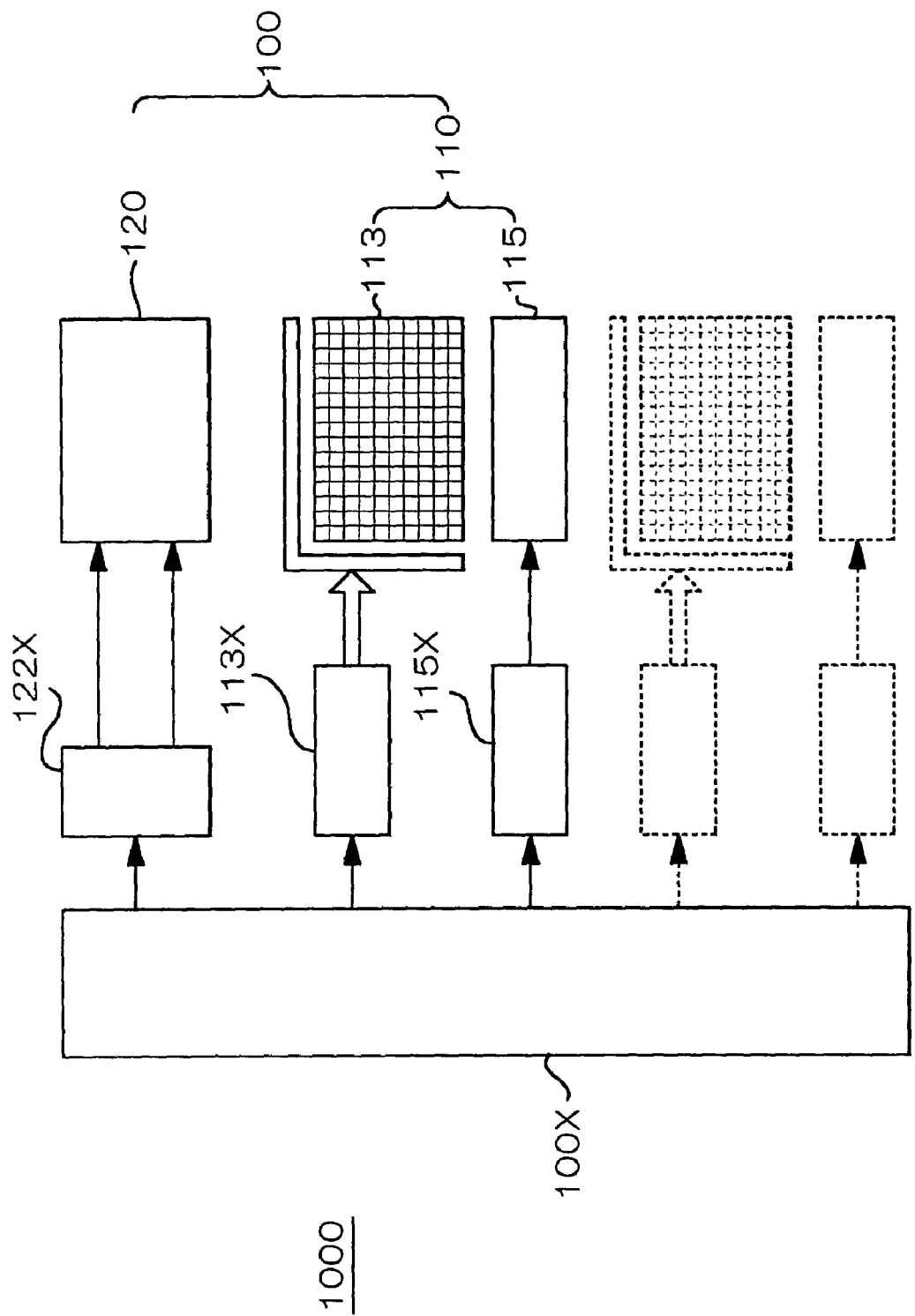
FIG. 16 is a schematic structural block diagram showing the structure of a display control system in an electronic apparatus including a display device.
Figure 17:
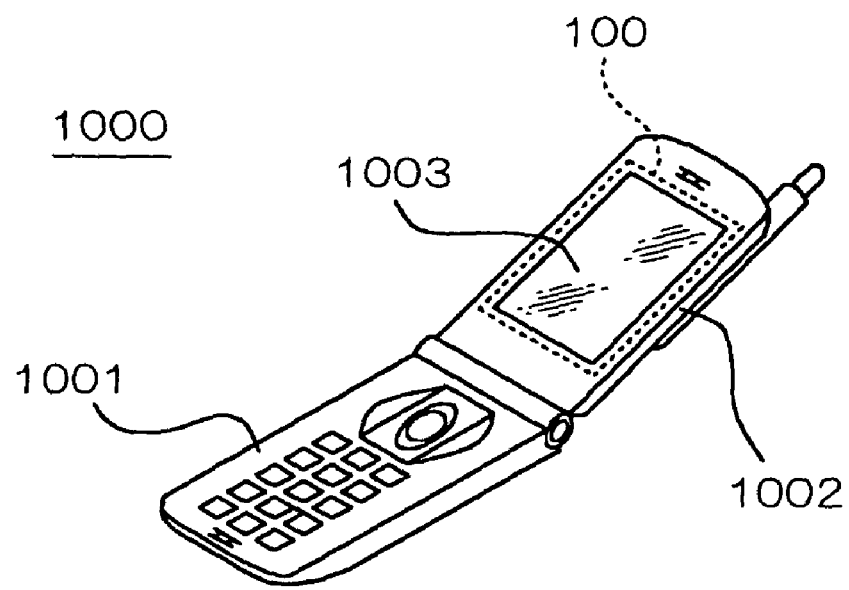
FIG. 17 is a schematic perspective view showing the appearance of an electronic apparatus (portable telephone).

An electronic apparatus 1000 of a tenth embodiment according to the invention will be described with reference to FIG. 16 and FIG. 17. The electronic apparatus 1000 includes the display device 100 of the above first embodiment. FIG. 16 is a schematic constitutional block diagram showing a display control system of the display device 100 to be disposed within the electronic apparatus 1000 in the form of combining it with the function realizing means, and FIG. 17 is a schematic perspective view showing the constitutional example (portable telephone) of the electronic apparatus 1000.

The electronic apparatus 1000 comprises a display driving unit 113X for driving the liquid crystal panel 113 provided on the display unit 110 of the display device 100, an illumination driving unit 115X for driving the back light 115 of the display unit 110, and a switch driving unit 122X for driving the liquid crystal panel 122 provided on the display switching unit 120. The display driving unit 113X, the illumination driving unit 115X, and the switch driving unit 122X are controlled by a controlling unit 100X. The above structure shows a display control system in the form of combining it with the function realizing means, and not showing the actual installation structure of the actual circuitry and circuit elements. Accordingly, all respective units may be formed within the display device 100, or they may be formed in the outside of the display device 100, that is, in the inside of the electronic apparatus 1000, that is, not in the display device 100, or one part may be formed within the display device 100 and the other part may be formed within the electronic apparatus 1000, that is, not in the display device 100.

The display driving unit 113X supplies a driving voltage for respectively driving a plurality of pixel regions, formed within the liquid crystal driving area of the liquid crystal panel 113, and for example, in the multiplex driving method or the active driving method, a scanning signal, and a data signal corresponding to the scanning signal, are synchronized and supplied to a common terminal (scanning line terminal) and a segment terminal (data line terminal) of the liquid crystal panel 113, respectively. The display data such as the image data is sent from a main circuit of the electronic apparatus 1000 to the display driving unit 113X via the controlling unit 100X.

The illumination driving unit 115X is to control a power supply to the back light 115 and, for example, to switch the on/off states of the back light 115.

The switch driving unit 122X controls a voltage applied to the liquid crystal panel 122, and determines whether the voltage of the threshold value or more is applied to two opposing transparent electrodes of the liquid crystal panel 122. When a plurality of pixels are provided in the liquid crystal panel 122, the switch driving unit 122X transmits the driving signals corresponding to these pixels.

The controlling unit 100X controls the display driving unit 113X, the illumination driving unit 115X, and the switch driving unit 122X, so as to perform a control instruction and data transmission to the respective units. For example, in case of making the display switching unit 120 in an optical transmissive state (transparent) and the display device 100 in a display mode, the liquid crystal panel 113 is driven by the display driving unit 113X to make a display, and at the same time, the liquid crystal panel 122 is controlled by the switch driving unit 122X to make the display switching unit 120 in an optical transmissive state. In case of making the display switching unit 120 in an optical reflective state (mirror surface) so as to make the display device 100 in a mirror mode, the liquid crystal panel 122 is controlled by the switch driving unit 122X so as to make the display switching unit 120 in an optical reflective state, and the liquid crystal panel 113 is made into the all cut off state (in a shutter closed state) by the display driving unit 113X, or the back light 115 is turned off by the illumination driving unit 115X.

As illustrated in FIG. 17, the electronic apparatus (equipment) 1000 of this embodiment can be formed as a portable telephone having a main body 1001 and a display body 1002. In this case, the display device 100 is disposed in the inner portion of the display body 1002, and a display screen 1003 can be visibly recognized on the display body 1002. Thus, depending on various operations and situations, a predetermined display image formed by the display unit 110 can be visibly recognized through the display switching unit 120 that is in an optical transmissive state, on the display screen 1003, or the mirror surface state realized by the display switching unit 120 can be visibly recognized. Accordingly, the electronic apparatus 1000 of the portable telephone can be used as a mirror.

Figure 18:
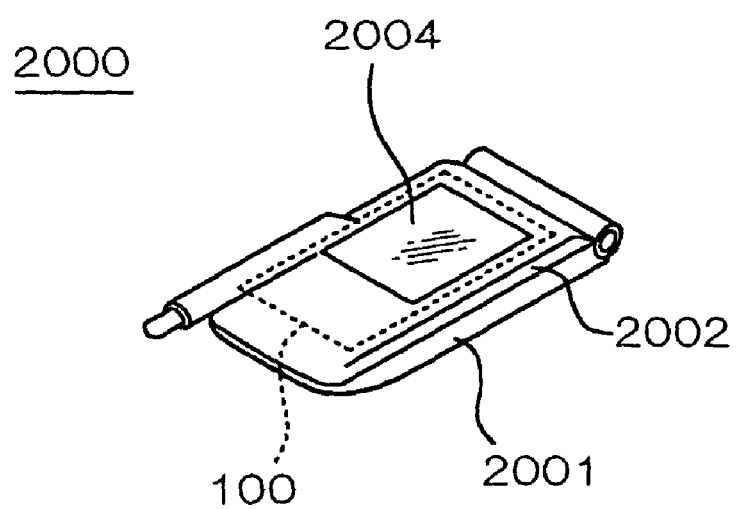
FIG. 18 is a schematic perspective view showing the appearance of another electronic apparatus (portable telephone).

When the electronic apparatus 1000 is applied to the portable telephone 2000, as illustrated in FIG. 18, another display screen 2004, different from the main display screen (the same screen as 1003) shown in FIG. 17, may be provided on the outer surface of the display body 2002, which is in a folded state to cover the main body 2001, and through this display screen 2004, it can be structured to visibly recognize a predetermined display without opening the display body 2002 from the main body 2001. In this case, by providing the display device 100 in addition to the main display device shown by a dotted line in FIG. 16, the display screen 2004 can be visibly recognized by the display device 100, separately from the main display screen. In the portable telephone 2000 of this embodiment, a display can be visibly recognized in a folded state, and also it can be served as a mirror in a folded state.

The display device and the electronic apparatus of the invention are not restricted to the above-mentioned illustrations only, but it is needless to say that various modification can be added to the above embodiments without departing from the spirit and the scope of the invention.

Effect of the Invention

As set forth hereinabove, according to the invention, the display quality can be improved in a display device capable of switching the display mode and the mirror mode on the display unit by controlling the display switching unit.

The entire disclosure of Japanese Patent Application No. 2002-196458 filed Jul. 4, 2002 is incorporated by reference.

What is claimed is:

1. A display device comprising:

a display unit for forming a predetermined display mode; and a display switching unit overlapping with the display unit at least in one portion, wherein the display switching unit includes first polarization component selecting means, polarized-light transmitting axis changing means, and second polarization component selecting means sequentially disposed from the display unit toward an observation side, the first polarization component selecting means transmits a first polarization component and reflects a second polarization component having a polarization axis intersecting with a polarization axis of the first polarization component, the polarized-light transmitting axis changing means is switchable between a state of transmitting light after changing the first polarization component into the second polarization component and a state of transmitting light without substantially changing the polarization axis of the incident light, the second polarization component selecting means transmits one of the first polarization component and the second polarization component and absorbs or reflects the other, the display unit emits the first polarization component for forming the display mode, and the display switching unit is provided with a region including the first polarization component selecting means and a region including a third polarization component selecting means for transmitting the first polarization component and for absorbing the second polarization component.

2. A display device comprising:
a display unit for forming a predetermined display mode; and
a display switching unit overlapping with the display unit at least in one portion,
wherein the display switching unit includes first polarization component selecting means, polarized-light transmitting axis changing means, and second polarization component selecting means sequentially disposed from the display unit toward an observation side,
the first polarization component selecting means transmits a first polarization component and reflects a second polarization component having a polarization axis intersecting with a polarization axis of the first polarization component,
the polarized-light transmitting axis changing means is switchable between a state of transmitting light after changing the first polarization component into the second polarization component and a state of transmitting light without substantially changing the polarization axis of the incident light,
the second polarization component selecting means transmits one of the first polarization component and the second polarization component and absorbs or reflects the other polarization component,
the display unit emits the first polarization component for forming the display mode,
the display unit includes an illuminating device disposed on the side of the display switching unit, and a reflective display device disposed on the opposite side of the illuminating device and away from the display switching unit,
the illuminating device emits light toward the reflective display device and transmits light incident from the reflective display device,
the polarized-light transmitting axis changing means includes a TN-type liquid crystal layer and a voltage application means for applying a predetermined electric field to the TN-type liquid crystal layer in a thickness direction,
the TN-type liquid crystal layer has And within a range of 0.7 μm to 1.7 μm, and
the display switching unit is provided with a region including the first polarization component selecting means, and a region including a third polarization component selecting means for transmitting the first polarization component and for absorbing the second polarization component instead of the first polarization component selecting means.

3. The display device according to claim 2, wherein the TN-type liquid crystal layer has the $\Delta n \cdot d$ within a range of 0.9 μm to 1.3 μm.

4. The display device according to claim 2, wherein the second polarization component selecting means is absorptive polarization selecting means for transmitting the one of the polarization components and absorbing the other polarization component.

5. The display device according to claim 2, wherein the display unit and the display switching unit are optically adhered to each other.

6. The display device according to claim 5, wherein the display unit and the display switching unit are optically adhered to each other by adhesive.

7. The display device according to claim 6, wherein refraction index of the adhesive layer is within a range of 1.30 to 1.50.

8. The display device according to claim 6, wherein the adhesive layer is a gel material.

9. The display device according to claim 2, wherein an anti-reflection coating is formed on both sides of the display switching unit.

10. The display device according to claim 9, wherein the anti-reflection coating is formed on a surface of the display unit on the side of the display switching unit.

11. The display device according to claim 2, wherein the display switching unit is provided with a whole pixel region, which includes a single pixel arranged on an entire face, and a pixel-arranged region, which includes a plurality of pixels, each pixel having a predetermined shape smaller than the whole pixel region.

12. The display device according to claim 2, wherein the display unit is provided with a region not overlapping with the display switching unit.

13. The display device according to claim 2, wherein the display switching unit is provided with a region not overlapping with the display unit two dimensionally, and a plurality of pixels of a predetermined shape are arranged in the region.

* * * * *